(12) United States Patent (10) Patent No.: US 12,660,736 B2
Feiner et al. (45) Date of Patent: Jun. 23, 2026

(54) SEED TREATMENT PROCESS FOR LARGE LIQUID VOLUMES

(71) Applicant: Monsanto Technology LLC, St. Louis, MO (US)

(72) Inventors: Michaela H. Feiner, St. Louis, MO (US); Vikram P. Mehrotra, Wildwood, MO (US); Sudabathula R. Rao, Wildwood, MO (US); Kali C. Williams, Arnold, MO (US)

(73) Assignee: Monsanto Technology LLC, Saint Louis, MO (US)

( * ) Notice: Subject to any disclaimer, the term of this patent is extended or adjusted under 35 U.S.C. 154(b) by 719 days.

(21) Appl. No.: 16/627,708

(22) PCT Filed: Jun. 29, 2018

(86) PCT No.: PCT/US2018/040170
§ 371 (c)(1),
(2) Date: Dec. 30, 2019

(87) PCT Pub. No.: WO2019/006226
PCT Pub. Date: Jan. 3, 2019

(65) Prior Publication Data
US 2020/0288627 A1 Sep. 17, 2020

Related U.S. Application Data

(60) Provisional application No. 62/526,811, filed on Jun. 29, 2017.

(51) Int. Cl.
*A01C 1/06* (2006.01)
*A01N 25/04* (2006.01)
*B05D 1/00* (2006.01)

(52) U.S. Cl.
CPC ............... *A01C 1/06* (2013.01); *A01N 25/04* (2013.01); *B05D 1/002* (2013.01)

(58) Field of Classification Search
None
See application file for complete search history.

(56) References Cited

U.S. PATENT DOCUMENTS

| | | | |
|---|---|---|---|
| 4,116,666 A | 9/1978 | Willard, Sr. | |
| 4,759,945 A * | 7/1988 | Nemecek | A01C 1/06 |
| | | | 427/346 |
| 5,087,475 A * | 2/1992 | Bazin | A01C 1/06 |
| | | | 47/57.6 |
| 5,260,213 A * | 11/1993 | Harman | A01C 1/06 |
| | | | 435/945 |
| 5,389,399 A | 2/1995 | Bazin et al. | |
| 5,443,637 A | 8/1995 | Long, Jr. et al. | |
| 5,494,709 A | 2/1996 | Long, Jr. et al. | |
| 5,586,412 A * | 12/1996 | Wadlington | D01B 1/04 |
| | | | 19/40 |
| 6,582,516 B1 | 6/2003 | Carlson | |
| 2013/0273236 A1 | 10/2013 | Reineccius et al. | |

FOREIGN PATENT DOCUMENTS

DE 3928202 3/1990

OTHER PUBLICATIONS

International Search Report and Written Opinion for PCT Application No. PCT/US2018/40170, Sep. 24, 2018, 9 pages, United States.

* cited by examiner

*Primary Examiner* — Vera Afremova
(74) *Attorney, Agent, or Firm* — Harness, Dickey & Pierce, P.L.C.

(57) ABSTRACT

Provided herein are processes for the preparation of treated seeds. Generally, the processes described herein include providing seeds in a seed treatment apparatus. The seeds are contacted with a liquid seed treatment, thereby producing wetted seeds. The wetted seeds are dried simultaneously with the application of the liquid seed treatment.

22 Claims, 11 Drawing Sheets

Dust in Soybeans g/100K seed

| | UTC | Hege 6 fl oz A3 with 1 fl oz AK418 and 0.1%SunMica | Vector 6 fl oz A3 with 1 fl oz AK418 and 0.1%SunMica | Hege 18 fl oz A7 with 2 fl oz AK418 and 0.1%SunMica | Vector 18 fl oz A7 with 2 fl oz AK418 and 0.1%SunMica |
|---|---|---|---|---|---|
| | 0 | 40 | 47 | 85 | 28 |
| Dust | 0.21 | 0.04 | 0.16 | 0.02 | 0.02 |

Flowability in Soybeans, mJ

| | UTC | Hege 6 fl oz A3 with 1 fl oz AK418 and 0.1%SunMica | Vector 6 fl oz A3 with 1 fl oz AK418 and 0.1%SunMica | Hege 18 fl oz A7 with 2 fl oz AK418 and 0.1%SunMica | Vector 18 fl oz A7 with 2 fl oz AK418 and 0.1%SunMica |
|---|---|---|---|---|---|
| | 0 | 40 | 47 | 85 | 28 |
| Flow | 208.78 | 179.83 | 206.78 | 231.66 | 224.60 |

% of Seeds in the Dish with Bare Spots

SEED TREATMENT PROCESS FOR LARGE LIQUID VOLUMES

REFERENCE TO RELATED APPLICATIONS

The present application is the 371 National Stage Application of International Patent Application No. PCT/US2018/040170, filed Jun. 29, 2018, which claims the benefit of U.S. Provisional Application No. 62/526,811, filed Jun. 29, 2017, the entire contents of which are incorporated herein by reference.

FIELD OF THE DISCLOSURE

The present disclosure generally relates to processes for preparation of treated seeds, and in a particular embodiment, to processes for preparation of treated seeds requiring large liquid volumes.

BACKGROUND

Seed treatments can be used to apply a variety of agronomically important chemistries (e.g., agrochemicals that are useful to improve the agronomic characteristics of the seed and/or a plant grown from the seed) to seeds. However, seed treatment methods known in the art suffer from several problems.

Due to the nature of conventional seed treatment formulations and the application methodology used industry-wide, treated seeds may exhibit non-uniform coverage, blotchiness and in general may not have a good visual appearance, often due to inconsistent adhesion of the coating to the seed surface, which results in poor shine and variations in color. Poor surface adhesion can also lead to rub-off of the coating, with a corresponding loss of active ingredients, further degradation of the visual appearance and potential production of unwanted dust during seed processing and planting.

Conventional seed treaters are limited in liquid load capacity, which presents a problem as the quantity of seed treatment that is required for application is increasing. For example, in some situations, traditional seed treaters may not be able to handle the volume of liquid required for seed application. Even when the seed treater has the capacity for the required liquid load, additional problems arise, such as the potential for seeds to soak in excess liquid, which in turn causes damage to the seeds. For example, soaking of a soybean seed leads to wrinkling and, ultimately, peeling off of the outer protective layer. Loss of this layer subjects the seed to increased mechanical damage and split seeds. Seed damage, in turn, may contribute to poor storability, weak plants, and lower crop yield.

Because liquid load in conventional seed treaters is limited, this can mean that a portion of the surface of a given seed is left untreated. For example, seeds with irregular surfaces, such as dents in flat corn seeds and folds in wheat seeds, frequently are left partially uncovered. These untreated areas may be vulnerable to pest infiltration.

Excess liquid load in conventional seed treaters can also interfere with the flow of the seeds through industrial manufacturing and distribution equipment, thereby increasing complexity and expense for the seed producer. Excessive stickiness and/or tackiness of the seeds, generated through excess liquid and incomplete drying, leads to a buildup of residue on the equipment. This residue may eventually break off into large chunks that are mixed among treated seeds. These chunks can plug planting equipment, resulting in planting errors and, ultimately, in lower crop yields.

Therefore, a need in the art exists for a seed treatment process that allows for higher liquid load to be applied to seeds to meet the increasing current and future demands of the seed treatments.

SUMMARY OF THE DISCLOSURE

A method of preparing treated seeds is provided, the method comprising providing seeds in a seed treatment apparatus, contacting the seeds with a liquid seed treatment, and drying the seeds contacted with the liquid seed treatment, wherein the contacting and drying steps occur simultaneously.

A treated seed is provided, wherein the seed is produced using a method as described herein.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1A:
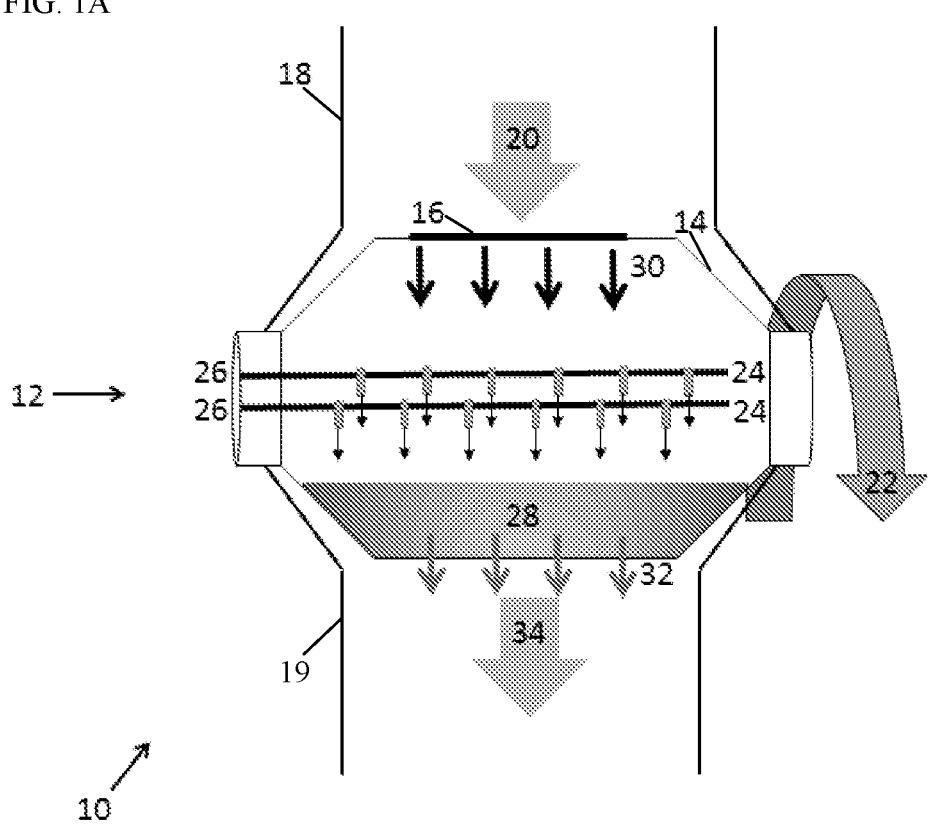
FIG. 1A is a front schematic view of a seed treatment apparatus having an integrated drying system.

In general, the methods described herein are suitable for applying a seed treatment to the exterior surfaces of seeds. The present disclosure describes a method of applying very high volumes or loads of seed treatments. The amount of seed treatment used in the methods described herein can be greater than the maximum amount of seed treatment typically allowed by traditional seed treatment equipment while maintaining and not negatively impacting the viability of the treated seeds. This enhanced seed treatment method is realized in part by the seed treatment apparatus constructed according to the teachings set forth herein which is functionally, technically, and commercially and economically suitable for seed treatment application.

In some methods described herein, seeds are provided in a seed treatment apparatus. The seeds are then brought into contact with a liquid seed treatment, thereby producing wetted seeds. The wetted seeds are dried, which occurs simultaneously with contacting the seeds with a liquid seed treatment. The exemplary steps are not necessarily in the order listed above. Two or more of the steps may be performed simultaneously. Two or more of the steps may be performed sequentially. Two or more of the steps may occur simultaneously, although it may not be necessary for the steps to begin and end at the same time in order to occur simultaneously. That is, to "occur simultaneously" two or more steps at least partially overlap in time, although initiation and/or completion of the steps may not be simultaneous.

Seeds and Plant Species

The seed treatment methods described herein can be used in connection with any species of plant and/or the seeds thereof. The methods are typically used in connection with seeds that are agronomically important. The seed may be a transgenic seed from which a transgenic plant can grow and incorporates a transgenic event that confers, for example, tolerance to a particular herbicide or combination of herbicides, increased disease resistance, enhanced tolerance to insects, drought, stress and/or enhanced yield. The seed may comprise a breeding trait, including for example, in one embodiment a disease tolerant breeding trait. In some instances, the seed includes at least one transgenic and breeding trait.

The process can be used for the treatment of any suitable seed type, including, but not limited to, row crops and vegetables. In some embodiments, one or more plants are selected from Amaranthaceae (e.g., chard, spinach, sugar beet, quinoa), Asteraceae (e.g., artichoke, asters, chamomile, chicory, chrysanthemums, dahlias, daisies, echinacea, goldenrod, guayule, lettuce, marigolds, safflower, sunflowers, zinnias), Brassicaceae (e.g., arugula, broccoli, bok choy, Brussels sprouts, cabbage, cauliflower, canola, collard greens, daikon, garden cress, horseradish, kale, mustard, radish, rapeseed, rutabaga, turnip, wasabi, watercress, *Arabidopsis thaliana*), Cucurbitaceae (e.g., cantaloupe, cucumber, honeydew, melon, pumpkin, squash (e.g., acorn squash, butternut squash, summer squash), watermelon, zucchini), Fabaceae (e.g., alfalfa, beans, carob, clover, guar, lentils, mesquite, peas, peanuts, soybeans, tamarind, tragacanth, vetch), Malvaceae (e.g., cacao, cotton, durian, hibiscus, kenaf, kola, okra), Poaceae (e.g., bamboo, barley, corn, fonio, lawn grass (e.g., Bahia grass, Bermudagrass, bluegrass, Buffalograss, Centipede grass, Fescue, or Zoysia), millet, oats, ornamental grasses, rice, rye, sorghum, sugar cane, triticale, wheat), Polygonaceae (e.g., buckwheat), Rosaceae (e.g., almonds, apples, apricots, blackberry, blueberry, cherries, peaches, plums, quinces, raspberries, roses, strawberries), Solanaceae (e.g., bell peppers, chili peppers, eggplant, petunia, potato, tobacco, tomato) and Vitaceae (e.g., grape).

Non-limiting examples of seeds that may be treated with compositions of the present disclosure include plants sold by Monsanto Company (St. Louis, MO) under the BOLLGARD II®, DROUGHTGARD®, GENUITY®, RIB COMPLETE®, ROUNDUP READY®, ROUNDUP READY 2 YIELD®, ROUNDUP READY 2 EXTEND™ SMARTSTAX®, VT DOUBLE PRO®, VT TRIPLE PRO®, YIELDGARD®, YIELDGARD VT ROOTWORM/ RR2®, YIELDGARD VT TRIPLE® and/or XTEND-FLEX™ tradenames.

Seed Treatment

In the processes described herein, the liquid seed treatment and the dry seed treatment may comprise one or more biological agents and/or agrochemicals and/or other agents. Non-limiting examples of useful biological agents include bacteria, fungi, beneficial nematodes, and viruses. Non-limiting examples of useful agrochemicals include pesticides, including fungicides, herbicides, insecticides, and nematicides. After being contacted by the liquid seed treatment, the seeds become "wetted seeds," as used herein. Upon drying and optional application of a dry seed treatment, the seeds become "treated seeds," as used herein.

The seed treatment compositions and formulations in some embodiments may comprise one or more pesticidal agents. Pesticidal agents include chemical pesticides and biopesticides or biocontrol agents. Various types of chemical pesticides and biopesticides include acaricides, insecticides, nematicides, fungicides, gastropodicides, herbicides, virucides, bactericides, and combinations thereof. Biopesticides or biocontrol agents may include bacteria, fungi, beneficial nematodes, and viruses that exhibit pesticidal activity. Compositions of embodiments of the present invention may comprise other agents for pest control, such as microbial extracts, plant growth activators, and/or plant defense agents.

Compositions in some embodiments may comprise one or more chemical acaricides, insecticides, and/or nematicides. Non-limiting examples of chemical acaricides, insecticides, and/or nematicides may include one or more carbamates, diamides, macrocyclic lactones, neonicotinoids, organophosphates, phenylpyrazoles, pyrethrins, spinosyns, synthetic pyrethroids, tetronic acids and/or tetramic acids. Non-limiting examples of chemical acaricides, insecticides, and nematicides that can be useful in compositions of the present disclosure include abamectin, acrinathrin, aldicarb, aldoxycarb, alpha-cypermethrin, betacyfluthrin, bifenthrin, cyhalothrin, cypermethrin, deltamethrin, csfenvalcrate, etofenprox, fenpropathrin, fenvalerate, flucythrinate, fosthiazate, lambda-cyhalothrin, gamma-cyhalothrin, permethrin, taufluvalinate, transfluthrin, zeta-cypermethrin, cyfluthrin, tefluthrin, eflusilanat, fubfenprox, pyrethrin, resmethrin, imidacloprid, acetamiprid, thiamethoxam, nitenpyram, thiacloprid, dinotefuran, clothianidin, imidaclothiz, chlorfluazuron, diflubenzuron, lufenuron, teflubenzuron, triflumuron, novaluron, flufenoxuron, hexaflumuron, bistrifluoron, noviflumuron, buprofezin, cyromazine, methoxyfenozide, tebufenozide, halofenozide, chromafenozide, endosulfan, fipronil, ethiprole, pyrafluprole, pyriprole, flubendiamide, chlorantraniliprole (e.g., Rynaxypyr), cyazypyr, emamectin, emamectin benzoate, abamectin, ivermectin, milbemectin, lepimectin, tebufenpyrad, fenpyroximate, pyridaben, fenazaquin, pyrimidifen, tolfenpyrad, dicofol, cyenopyrafen, cyflumetofen, acequinocyl, fluacrypyrin, bifenazate, diafenthiuron, etoxazole, clofentezine, spinosad, triarathen, tetradifon, propargite, hexythiazox, bromopropylate, chinomethionat, amitraz, pyrifluquinazon, pymetrozine, flonicamid, pyriproxyfen, diofenolan, chlorfenapyr, metaflumizone, indoxacarb, chlorpyrifos, spirodiclofen, spiromesifen, spirotetramat, pyridalyl, spinctoram, acephate, triazophos, profenofos, oxamyl, spinetoram, fenamiphos, fenamiploth-iahos, 4-{[(6-chloropyrid-3-yl)methyl](2,2-difluoroethyl) amino}furan-2(5H)-one, 3,5-disubstituted-1,2,4-oxadiazole compounds, 3-phenyl-5-(thien-2-yl)-1,2,4-oxadiazole, cadusaphos, carbaryl, carbofuran, ethoprophos, thiodicarb, metamidophos, methiocarb, sulfoxaflor, cyantraniliprole and tioxazofen and combinations thereof. Additional non-limiting examples of chemical acaricides, insecticides, and/or nematicides may include one or more of abamectin, aldicarb, aldoxycarb, bifenthrin, carbofuran, chlorantraniliporle, chlothianidin, cyfluthrin, cyhalothrin, cypermethrin, cyantraniliprole, deltamethrin, dinotefuran, emamectin, ethiprole, fenamiphos, fipronil, flubendiamide, fosthiazate, imidacloprid, ivermectin, lambda-cyhalothrin, milbemectin, nitenpyram, oxamyl, permethrin, spinetoram, spinosad, spirodichlofen, spirotetramat, tefluthrin, thiacloprid, thiamethoxam and/or thiodicarb, and combinations thereof.

Additional non-limiting examples of acaricides, insecticides, and nematicides that may be included or used in compositions in some embodiments may be found in Steffey and Gray, *Managing Insect Pests*, Illinois Agronomy Handbook (2008); and Niblack, *Nematodes*, Illinois Agronomy Handbook (2008), the contents and disclosures of which are incorporated herein by reference. Non-limiting examples of commercial insecticides which may be suitable for the compositions disclosed herein include CRUISER (Syngenta, Wilmington, Delaware), GAUCHO and PONCHO (Gustafson, Plano, Texas). Active ingredients in these and other commercial insecticides may include thiamethoxam, clothianidin, and imidacloprid. Commercial acaricides, insecticides, and/or nematicides may be used in accordance with a manufacturer's recommended amounts or concentrations.

According to some embodiments, compositions in some embodiments may comprise one or more biopesticidal microorganisms, the presence and/or output of which is toxic to an acarid, insect and/or nematode. For example, compositions of embodiments of the present invention may comprise one or more of *Bacillus firmus* 1-1582, *Bacillus mycoides* AQ726, NRRL B-21664; *Beauveria bassiana* ATCC-74040, *Beauveria bassiana* ATCC-74250, *Burkholderia* sp. A396 sp. nov. rinojensis, NRRL B-50319, *Chromobacterium subtsugae* NRRL B-30655, *Chromobacterium vaccinii* NRRL B-50880, *Flavobacterium* H492, NRRL B-50584, *Metarhizium anisopliae* F52 (also known as *Metarhizium anisopliae* strain 52, *Metarhizium anisopliae* strain 7, *Metarhizium anisopliae* strain 43, and/or *Metarhizium anisopliae* BIO-1020, TAE-001; deposited as DSM 3884, DSM 3885, ATCC 90448, SD 170 and ARSEF 7711), *Paecilomyces fumosoroseus* FE991, and combinations thereof.

Compositions in some embodiments comprise one or more chemical fungicides. Non-limiting examples of chemical fungicides may include one or more aromatic hydrocarbons, benzthiadazole, carboxylic acid amides, morpholines, phenylamides, phosphonates, thiazolidines, thiophene, quinone outside inhibitors and strobilurins, such as azoxystrobin, coumethoxystrobin, coumoxystrobin, dimoxystrobin, enestroburin, fluoxastrobin, kresoxim-methyl, metominostrobin, orysastrobin, picoxystrobin, pyraclostrobin, pyrametostrobin, pyraoxystrobin, pyribencarb, trifloxystrobin, 2-[2-(2,5-dimethyl-phenoxymethyl)-phenyl]-3-methoxy-acrylic acid methyl ester, and 2-(2-(3-(2,6-dichlorophenyl)-1-methyl-allylideneaminooxymethyl)-phenyl)-2-methoxyimino-N-methyl-acetamide, carboxamides, such as carboxanilides (e.g., benalaxyl, benalaxyl-M, benodanil, bixafen, boscalid, carboxin, fenfuram, fenhexamid, flutolanil, fluxapyroxad, furametpyr, isopyrazam, isotianil, kiralaxyl, mepronil, metalaxyl, metalaxyl-M (mefenoxam), ofurace, oxadixyl, oxycarboxin, penflufen, penthiopyrad, sedaxane, tecloftalam, thifluzamide, tiadinil, 2-amino-4-methyl-thiazole-5-carboxanilide, N-(4'-trifluoromethylthio-biphenyl-2-yl)-3-difluoromethyl-1-methyl-1H-pyra-zole-4-carboxamide, N-(2-(1,3,3-trimethylbutyl)-phenyl)-1,3-dimethyl-5-fluoro-1H-pyrazole-4-carboxamide), carboxylic morpholides (e.g., dimethomorph, flumorph, pyrimorph), benzoic acid amides (e.g., flumetover, fluopicolide, fluopyram, zoxamide), carpropamid, dicyclomet, mandiproamid, oxytetracyclin, silthiofam, and N-(6-methoxy-pyridin-3-yl) cyclopropanecarboxylic acid amide, azoles, such as triazoles (e.g., azaconazole, bitertanol, bromuconazole, cyproconazole, difenoconazole, diniconazole, diniconazole-M, epoxiconazole, fenbuconazole, fluquinconazole, flusilazole, flutriafol, hexaconazole, imibenconazole, ipconazole, metconazole, myclobutanil, oxpoconazole, paclobutrazole, penconazole, propiconazole, prothioconazole, simeconazole, tebuconazole, tetraconazole, triadimefon, triadimenol, triticonazole, uniconazole) and imidazoles (e.g., cyazofamid, imazalil, pefurazoate, prochloraz, triflumizol); heterocyclic compounds, such as pyridines (e.g., fluazinam, pyrifenox (cf Dlb), 3-[5-(4-chloro-phenyl)-2,3-dimethyl-isoxazolidin-3-yl]-pyridine, 3-[5-(4-methyl-phenyl)-2,3-di-methyl-isoxazolidin-3-yl]-pyridine), pyrimidines (e.g., bupirimate, cyprodinil, diflumetorim, fenarimol, ferimzone, mepanipyrim, nitrapyrin, nuarimol, pyrimethanil), piperazines (e.g., triforine), pirroles (e.g., fenpiclonil, fludioxonil), morpholines (e.g., aldimorph, dodemorph, dodemorph-acetate, fenpropimorph, tridemorph), piperidines (e.g., fenpropidin); dicarboximides (e.g., fluoroimid, iprodione, procymidone, vinclozolin), non-aromatic 5-membered heterocycles (e.g., famoxadone, fenamidone, flutianil, octhilinone, probenazole, 5-amino-2-isopropyl-3-oxo-4-ortho-tolyl-2,3-dihydro-pyrazole-1-carbothioic acid S-allyl ester), acibenzolar-S-methyl, ametoctradin, amisulbrom, anilazin, blasticidin-S, captafol, captan, chinomethionat, dazomet, debacarb, diclomezine, difenzoquat, difenzoquat-methylsulfate, fenoxanil, Folpet, oxolinic acid, piperalin, proquinazid, pyroquilon, quinoxyfen, triazoxide, tricyclazole, 2-butoxy-6-iodo-3-propylchromen-4-one, 5-chloro-1-(4,6-dimethoxy-pyrimidin-2-yl)-2-methyl-1H-benzoimidazole and 5-chloro-7-(4-methylpiperidin-1-yl)-6-(2,4,6-trifluorophenyl)-[1,2,4]triazolo-[1,5-a]pyrimidine; benzimidazoles, such as carbendazim; and other active substances, such as guanidines (e.g., guanidine, dodine, dodine free base, guazatine, guazatine-acetate, iminoctadine), iminoctadine-triacetate and iminoctadine-tris(albesilate); antibiotics (e.g., kasugamycin, kasugamycin hydrochloride-hydrate, streptomycin, polyoxine and validamycin A), nitrophenyl derivates (e.g., binapacryl, dicloran, dinobuton, dinocap, nitrothal-isopropyl, tecnazen). organometal compounds (e.g., fentin salts, such as fentin-acetate, fentin chloride, fentin hydroxide); sulfur-containing heterocyclyl compounds (e.g., dithianon, isoprothiolane), organophosphorus compounds (e.g., edifenphos, fosetyl, fosetyl-aluminum, iprobenfos, phosphorus acid and its salts, pyrazophos, tolclofos-methyl), organochlorine compounds (e.g., chlorothalonil, dichlofluanid, dichlorophen, flusulfamide, hexachlorobenzene, pencycuron, pentachlorphenole and its salts, phthalide, quintozene, thiophanate-methyl, thiophanates, tolylfluanid, N-(4-chloro-2-nitro-phenyl)-N-ethyl-4-methyl-benzenesulfonamide) and inorganic active substances (e.g., Bordeaux mixture, copper acetate, copper hydroxide, copper oxychloride, basic copper sulfate, sulfur) and combinations thereof. In an aspect, compositions in some embodiments comprise acibenzolar-S-methyl, azoxystrobin, benalaxyl, bixafen, boscalid, carbendazim, cyproconazole, dimethomorph, epoxiconazole, fludioxonil, fluopyram, fluoxastrobin, flutianil, flutolanil, fluxapyroxad, fosetyl-Al, ipconazole, isopyrazam, kresoxim-methyl, mefenoxam, metalaxyl, metconazole, myclobutanil, orysastrobin, penflufen, penthiopyrad, picoxystrobin, propiconazole, prothioconazole, pyraclostrobin, sedaxane, silthiofam, tebuconazole, thiabendazole, thifluzamide, thiophanate, tolclofos-methyl, trifloxystrobin and triticonazole, and combinations thereof.

For additional examples of fungicides that may be included in compositions in some embodiments, see, e.g., Bradley, *Managing Diseases*, ILLINOIS AGRONOMY HANDBOOK (2008), the content and disclosure of which are incorporated herein by reference.

Fungicides useful for compositions in some embodiments may exhibit activity against one or more fungal plant pathogens, including but not limited to *Phytophthora, Rhizoctonia, Fusarium, Pythium, Phomopsis, Selerotinia* or *Phakopsora*, and combinations thereof. Non-limiting examples of commercial fungicides which may be suitable for the compositions in some embodiments include PROTÉGÉ, RIVAL or ALLEGIANCE FL or LS (Gustafson, Plano, Texas), WARDEN RTA (Agrilance, St. Paul, Minnesota), APRON XL, APRON MAXX RTA or RFC, MAXIM 4FS or XL (Syngenta, Wilmington, Delaware), CAPTAN (Arvesta, Guelph, Ontario) and PROTREAT (Nitragin Argentina, Buenos Ares, Argentina). Active ingredients in these and other commercial fungicides include, but are not limited to, fludioxonil, mefenoxam, azoxystrobin and metalaxyl. Commercial fungicides may be used in accordance with a manufacturer's recommended amounts or concentrations.

According to some embodiments, compositions in some embodiments may comprise one or more biopesticidal microorganisms, the presence and/or output of which is toxic to at least one fungus, bacteria, or both. For example, compositions of some embodiments may comprise one or more of *Ampelomyces quisqualis* AQ 10® (Intrachem Bio GmbH & Co. KG, Germany), *Aspergillus flavus* AFLA-GUARD® (Syngenta Crop Protection, Inc., CH), *Aureobasidium pullulans* BOTECTOR® (bio-ferm GmbH, Germany), *Bacillus pumilus* AQ717 (NRRL B-21662), *Bacillus pumilus* NRRL B-30087, *Bacillus* AQ175 (ATCC 55608), *Bacillus* AQ177 (ATCC 55609), *Bacillus subtilis* AQ713 (NRRL B-21661), *Bacillus subtilis* AQ743 (NRRL B-21665), *Bacillus amyloliquefaciens* FZB24, *Bacillus amyloliquefaciens* FZB42, *Bacillus amyloliquefaciens* NRRL B-50349, *Bacillus amyloliquefaciens* TJ1000 (also known as 1BE, isolate ATCC BAA-390), *Bacillus subtilis* ATCC 55078, *Bacillus subtilis* ATCC 55079, *Bacillus thuringiensis* AQ52 (NRRL B-21619), *Candida oleophila*

I-182 (e.g., ASPIRE® from Ecogen Inc., USA), *Candida saitoana* BIOCURE® (in mixture with lysozyme; BASF, USA) and BIOCOAT® (ArystaLife Science, Ltd., Cary, NC), *Clonostachys rosea* f. *catenulata* (also referred to as *Gliocladium catenulatum*) J1446 (PRESTOP®, Verdera, Finland), *Coniothyrium minitans* CONTANS® (Prophyta, Germany), *Cryphonectria parasitica* (CNICM, France), *Cryptococcus albidus* YIELD PLUS® (Anchor Bio-Technologies, South Africa), *Fusarium oxysporum* BIOFOX® (from S.I.A.P.A., Italy) and FUSACLEAN® (Natural Plant Protection, France), *Metschnikowia fructicola* SHEMER® (Agrogreen, Israel), *Microdochium dimerum* ANTIBOT® (Agrauxine, France), *Muscodor albus* NRRL 30547, *Muscodor roseus* NRRL 30548, *Phlebiopsis gigantea* ROTSOP® (Verdera, Finland), *Pseudozyma flocculosa* SPORODEX® (Plant Products Co. Ltd., Canada), *Pythium oligandrum* DV74 (POLYVERSUM®, Remeslo SSRO, Biopreparaty, Czech Rep.), *Reynoutria sachlinensis* (e.g., REGALIA® from Marrone BioInnovations, USA), *Streptomyces* NRRL B-30145, *Streptomyces* M1064, *Streptomyces galbus* NRRL 30232, *Streptomyces lydicus* WYEC 108 (ATCC 55445), *Streptomyces violaceusniger* YCED 9 (ATCC 55660; DE-THATCH-9®, DECOMP-9® and THATCH CONTROL®, Idaho Research Foundation, USA), *Streptomyces* WYE 53 (ATCC 55750; DE-THATCH-9®, DECOMP-9® and THATCH CONTROL®, Idaho Research Foundation, USA), *Talaromyces flavus* V117b (PROTUS®, Prophyta, Germany), *Trichoderma asperellum* SKT-1 (ECO-HOPE®, Kumiai Chemical Industry Co., Ltd., Japan), *Trichoderma atroviride* LC52 (SENTINEL®, Agrimm Technologies Ltd, NZ), *Trichoderma harzianum* T-22 (PLANTSHIELD®, der Firma BioWorks Inc., USA), *Trichoderma harzianum* TH-35 (ROOT PRO®, from Mycontrol Ltd., Israel), *Trichoderma harzianum* T-39 (TRICHODEX®, Mycontrol Ltd., Israel; TRICHODERMA 2000®, Makhteshim Ltd., Israel), *Trichoderma harzianum* ICC012 and *Trichoderma viride* TRICHOPEL (Agrimm Technologies Ltd, NZ), *Trichoderma harzianum* ICC012 and *Trichoderma viride* ICC080 (REMEDIER® WP, Isagro Ricerca, Italy), *Trichoderma polysporum* and *Trichoderma harzianum* (BINAB®, BINAB Bio-Innovation AB, Sweden), *Trichoderma stromaticum* TRICOVAB® (C.E-.P.L.A.C., Brazil), *Trichoderma virens* GL-21 (SOIL-GARD®, Certis LLC, USA), *Trichoderma virens* G1-3 (ATCC 57678), *Trichoderma virens* G1-21 (Thermo Trilogy Corporation, Wasco, CA), *Trichoderma virens* G1-3 and *Bacillus amyloliquefaciens* FZB24, *Trichoderma virens* G1-3 and *Bacillus amyloliquefaciens* NRRL B-50349, *Trichoderma virens* G1-3 and *Bacillus amyloliquefaciens* TJ1000, *Trichoderma virens* G1-21 and *Bacillus amyloliquefaciens* FZB24, *Trichoderma virens* G1-21 and *Bacillus amyloliquefaciens* NRRL B-50349, *Trichoderma virens* G1-21 and *Bacillus amyloliquefaciens* TJ1000, *Trichoderma viride* TRIECO® (Ecosense Labs. (India) Pvt. Ltd., India, BIO-CURE® F from T. Stanes & Co. Ltd., Indien), *Trichoderma viride* TV1 (Agribiotec srl, Italy), *Trichoderma viride* ICC080, and/or *Ulocladium oudemansii* HRU3 (BOTRYZEN®, Botry-Zen Ltd, NZ), and combinations thereof.

Compositions in some embodiments may comprise one or more chemical herbicides. The herbicide may be a pre-emergent herbicide, a post-emergent herbicide, or a combination thereof. Non-limiting examples of chemical herbicides may comprise one or more acetyl CoA carboxylase (ACCase) inhibitors, acetolactate synthase (ALS) inhibitors, acetanilides, acetohydroxy acid synthase (AHAS) inhibitors, photosystem II inhibitors, photosystem I inhibitors, protoporphyrinogen oxidase (PPO or Protox) inhibitors, carotenoid biosynthesis inhibitors, enolpyruvylshikimate-3-phos-phate (EPSP) synthase inhibitors, glutamine synthetase inhibitors, dihydropteroate synthetase inhibitors, mitosis inhibitors, 4-hydroxyphenyl-pyruvate-dioxygenase (4-HPPD) inhibitors, synthetic auxins, auxin herbicide salts, auxin transport inhibitors, nucleic acid inhibitors and/or one or more salts, esters, racemic mixtures and/or resolved isomers thereof. Non-limiting examples of chemical herbi-cides that can be useful in compositions of the present disclosure include 2,4-dichlorophenoxyacetic acid (2,4-D), 2,4,5-trichlorophenoxyacetic acid (2,4,5-T), ametryn, ami-carbazone, aminocyclopyrachlor, acetochlor, acifluorfen, alachlor, atrazine, azafenidin, bentazon, benzofenap, bifenox, bromacil, bromoxynil, butachlor, butafenacil, butroxydim, carfentrazone-ethyl, chlorimuron, chlorotoluro, clethodim, clodinafop, clomazone, cyanazine, cycloxydim, cyhalofop, desmedipham, desmetryn, dicamba, diclofop, dimefuron, diuron, dithiopyr, fenoxaprop, fluazifop, fluazi-fop-P, fluometuron, flufenpyr-ethyl, flumiclorac, flumiclo-rac-pentyl, flumioxazin, fluoroglycofen, fluthiacet-methyl, fomesafen, fomesafen, glyphosate, glufosinate, halosulfu-ron, haloxyfop, hexazinone, imazamox, imazaquin, imazethapyr, ioxynil, isoproturon, isoxaflutole, lactofen, lin-uron, mecoprop, mecoprop-P, mesotrion, metamitron, meta-zochlor, methibenzuron, metolachlor (and S-metolachlor), metoxuron, metribuzin, monolinuron, oxadiargyl, oxadi-azon, oxyfluorfen, phenmedipham, pretilachlor, pro-foxydim, prometon, promETRY, propachlor, propanil, propa-quizafop, propisochlor, pyraflufen-ethyl, pyrazon, pyrazolynate, pyrazoxyfen, pyridate, quizalofop, quizalo-fop-P (e.g., quizalofop-ethyl, quizalofop-P-ethyl, clodin-afop-propargyl, cyhalofop-butyl, diclofop-methyl, fenoxaprop-P-ethyl, fluazifop-P-butyl, haloxyfop-methyl, haloxyfop-R-methyl), saflufenacil, sethoxydim, siduron, simazine, simetryn, sulcotrione, sulfentrazone, tebuthiuron, tembotrione, tepraloxydim, terbacil, terbumeton, terbuthyla-zine, thaxtomin (e.g., the thaxtomins described in U.S. Pat. No. 7,989,393), thenylchlor, tralkoxydim, triclopyr, tri-etazine, trifloxysulfuron, tropramezone, salts and esters thereof; racemic mixtures and resolved isomers thereof and combinations thereof. In an embodiment, compositions comprise acetochlor, clethodim, dicamba, flumioxazin, fomesafen, glyphosate, glufosinate, mesotrione, quizalofop, saflufenacil, sulcotrione, S-3100 and/or 2,4-D, and combi-nations thereof.

Additional examples of herbicides that may be included in compositions in some embodiments may be found in Hager, *Weed Management*, ILLINOIS AGRONOMY HANDBOOK (2008); and Loux et al., Weed Control Guide for Ohio, Indiana and Illinois (2015), the contents and disclosures of which are incorporated herein by reference. Commercial herbicides may be used in accordance with a manufacturer's recom-mended amounts or concentrations.

Compositions in some embodiments may comprise one or more virucides.

According to some embodiments, compositions in some embodiments may comprise one or more biopesticidal or herbicidal microorganisms, the presence and/or output of which is toxic to at least one insect, plant (weed), or phytopathogenic virus, as the case may be.

Additional examples of biopesticides that may be included or used in compositions in some embodiments may be found in BURGES, supra; HALL & MENN, BIOPESTICIDES: USE AND DELIVERY (Humana Press) (1998); McCoy et al., *Ento-mogenous fungi*, in CRC HANDBOOK OF NATURAL PESTICIDES. MICROBIAL PESTICIDES, PART A. ENTOMOGENOUS PROTOZOA AND FUNGI (C. M. Inoffo, ed.), Vol. 5:151-236 (1988); SAMSON et al., ATLAS OF ENTOMOPATHOGENIC FUNGI (Springer-Verlag, Ber-lin) (1988); and deFaria and Wraight, *Mycoinsecticides and Mycoacaricides: A comprehensive list with worldwide cov-erage and international classification of formulation types*, BIOL. CONTROL (2007), the contents and disclosures of which are incorporated herein by reference. In certain embodi-ments, a biocontrol microbe may comprise a bacterium of the genus *Actinomycetes, Agrobacterium, Arthrobacter, Alcaligenes, Aureobacterium, Azobacter, Bacillus, Beijer-inckia, Brevibacillus, Burkholderia, Chromobacterium, Clostridium, Clavibacter, Comamonas, Corynebacterium, Curtobacterium, Enterobacter, Flavobacterium, Glucono-bacter, Hydrogenophaga, Klebsiella, Methylobacterium, Paenibacillus, Pasteuria, Photorhabdus, Phyllobacterium, Pseudomonas, Rhizobium, Serratia, Sphingobacterium, Stenotrophomonas, Variovorax,* and *Xenorhabdus*, or any combination thereof. According to some embodiments, a biopesticidal microbe may include one or more of *Bacillus amyloliquefaciens, Bacillus cereus, Bacillus firmus, Bacil-lus, lichenformis, Bacillus pumilus, Bacillus sphaericus, Bacillus subtilis, Bacillus thuringiensis, Chromobacterium suttsuga, Pasteuria penetrans, Pasteuria usage,* and *Pseudomona fluorescens*. According to some embodiments, a biopesticidal microbe may comprise a fungus of the genus *Alternaria, Ampelomyces, Aspergillus, Aureobasidium, Beauveria, Colletotrichum, Coniothyrium, Gliocladium, Metarhizium, Muscodor, Paecilomyces, Trichoderma, Typhula, Ulocladium,* and *Verticillium*. In another aspect a fungus is *Beauveria bassiana, Coniothyrium minitans, Glio-cladium virens, Muscodor albus, Paecilomyces lilacinus,* or *Trichoderma polysporum*.

A composition in some embodiments may comprise one or more biocidal agents. A biocidal component may be included or used to prevent fungal and/or bacterial growth in the composition, particularly when the composition is placed in storage. Examples of biocidal agents include dichlorophen or benzyl alcohol hemiformal based com-pounds, benzoisothiazolinones and rhamnolipids. Non-lim-iting examples of commercially available biocidal agents include ACTICIDE (THOR), PROXEL (Arch Chemical), and ZONIX (Jeneil).

In addition to a microbial strain or isolate compositions and formulations in some embodiments may further com-prise one or more agriculturally beneficial agents, such as biostimulants, nutrients, plant signal molecules, or biologi-cally active agents.

According to some embodiments, compositions may comprise one or more beneficial biostimulants. Biostimu-lants may enhance metabolic or physiological processes such as respiration, photosynthesis, nucleic acid uptake, ion uptake, nutrient delivery, or a combination thereof. Non-limiting examples of biostimulants that may be included or used in compositions of embodiments of the present inven-tion may include seaweed extracts (e.g., *Ascophyllum nodo-sum*), bacterial extracts (e.g., extracts of one or more diazo-trophs, phosphate-solubilizing microorganisms and/or biopesticides), fungal extracts, humic acids (e.g., potassium humate), fulvic acids, myo-inositol, and/or glycine, and any combinations thereof. According to some embodiments, the biostimulants may comprise one or more *Azospirillum* extracts (e.g., an extract of media comprising *A. brasilense* INTA Az-39), one or more *Bradyrhizobium* extracts (e.g., an extract of media comprising *B. elkanii* SEMIA 501, *B. elkanii* SEMIA 587, *B. elkanii* SEMIA 5019, *B. japonicum* NRRL B-50586 (also deposited as NRRL B-59565), *B. japonicum* NRRL B-50587 (also deposited as NRRL B-59566), *B. japonicum* NRRL B-50588 (also deposited as NRRL B-59567), *B. japonicum* NRRL B-50589 (also deposited as NRRL B-59568), *B. japonicum* NRRL B-50590 (also deposited as NRRL B-59569), *B. japonicum* NRRL B-50591 (also deposited as NRRL B-59570), *B. japonicum* NRRL B-50592 (also deposited as NRRL B-59571), *B. japonicum* NRRL B-50593 (also deposited as NRRL B-59572), *B. japonicum* NRRL B-50594 (also deposited as NRRL B-50493), *B. japonicum* NRRL B-50608, *B. japonicum* NRRL B-50609, *B. japonicum* NRRL B-50610, *B. japonicum* NRRL B-50611, *B. japonicum* NRRL B-50612, *B. japonicum* NRRL B-50726, *B. japonicum* NRRL B-50727, *B. japonicum* NRRL B-50728, *B. japonicum* NRRL B-50729, *B. japonicum* NRRL B-50730, *B. japonicum* SEMIA 566, *B. japonicum* SEMIA 5079, *B. japonicum* SEMIA 5080, *B. japonicum* USDA 6, *B. japonicum* USDA 110, *B. japonicum* USDA 122, *B. japonicum* USDA 123, *B. japonicum* USDA 127, *B. japonicum* USDA 129 and/or *B. japonicum* USDA 532C), one or more *Rhizobium* extracts (e.g., an extract of media comprising *R. leguminosarum* SO12A-2), one or more *Sinorhizobium* extracts (e.g., an extract of media comprising *S. fredii* CCBAU114 and/or *S. fredii* USDA 205), one or more *Penicillium* extracts (e.g., an extract of media comprising *P. bilaiae* ATCC 18309, *P. bilaiae* ATCC 20851, *P. bilaiae* ATCC 22348, *P. bilaiae* NRRL 50162, *P. bilaiae* NRRL 50169, *P. bilaiae* NRRL 50776, *P. bilaiae* NRRL 50777, *P. bilaiae* NRRL 50778, *P. bilaiae* NRRL 50777, *P. bilaiae* NRRL 50778, *P. bilaiae* NRRL 50779, *P. bilaiae* NRRL 50780, *P. bilaiae* NRRL 50781, *P. bilaiae* NRRL 50782, *P. bilaiae* NRRL 50783, *P. bilaiae* NRRL 50784, *P. bilaiae* NRRL 50785, *P. bilaiae* NRRL 50786, *P. bilaiae* NRRL 50787, *P. bilaiae* NRRL 50788, *P. bilaiae* RS7B-SD1, *P. brevicompactum* AgRF18, *P. canescens* ATCC 10419, *P. expansum* ATCC 24692, *P. expansum* YT02, *P. fellatanum* ATCC 48694, *P. gaestrivorus* NRRL 50170, *P. glabrum* DAOM 239074, *P. glabrum* CBS 229.28, *P. janthinellum* ATCC 10455, *P. lanosocoeruleum* ATCC 48919, *P. radicum* ATCC 201836, *P. radicum* FRR 4717, *P. radicum* FRR 4719, *P. radicum* N93/47267 and/or *P. raistrickii* ATCC 10490), one or more *Pseudomonas* extracts (e.g., an extract of media comprising *P. jessenii* PS06), one or more acaricidal, insecticidal and/or nematicidal extracts (e.g., an extract of media comprising *Bacillus firmus* 1-1582, *Bacillus mycoides* AQ726, NRRL B-21664; *Beauveria bassiana* ATCC-74040, *Beauveria bassiana* ATCC-74250, *Burkholderia* sp. A396 sp. nov. rinojensis, NRRL B-50319, *Chromobacterium subtsugae* NRRL B-30655, *Chromobacterium vaccinii* NRRL B-50880, *Flavobacterium* H492, NRRL B-50584, *Metarhizium anisopliae* F52 (also known as *Metarhizium anisopliae* strain 52, *Metarhizium anisopliae* strain 7, *Metarhizium anisopliae* strain 43 and *Metarhizium anisopliae* BIO-1020, TAE-001; deposited as DSM 3884, DSM 3885, ATCC 90448, SD 170 and ARSEF 7711) and/or *Paecilomyces fumosoroseus* FE991), and/or one or more fungicidal extracts (e.g., an extract of media comprising *Ampelomyces quisqualis* AQ 10® (Intrachem Bio GmbH & Co. KG, Germany), *Aspergillus flavus* AFLA-GUARD® (Syngenta Crop Protection, Inc., CH), *Aureobasidium pullulans* BOTECTOR® (bio-ferm GmbH, Germany), *Bacillus pumilus* AQ717 (NRRL B-21662), *Bacillus pumilus* NRRL B-30087, *Bacillus* AQ175 (ATCC 55608), *Bacillus* AQ177 (ATCC 55609), *Bacillus subtilis* AQ713 (NRRL B-21661), *Bacillus subtilis* AQ743 (NRRL B-21665), *Bacillus amyloliquefaciens* FZB24, *Bacillus amyloliquefaciens* NRRL B-50349, *Bacillus amyloliquefaciens* TJ1000 (also known as 1BE, isolate ATCC BAA-390), *Bacillus thuringiensis* AQ52 (NRRL B-21619), *Candida oleophila* 1-82 (e.g., ASPIRE® from Ecogen Inc., USA), *Candida saitoana* BIO-CURE® (in mixture with lysozyme; BASF, USA) and BIOCOAT® (ArystaLife Science, Ltd., Cary, NC), *Clonostachys rosea* f. *catenulata* (also referred to as *Gliocladium catenulatum*) J1446 (PRESTOP®, Verdera, Finland), *Coniothyrium minitans* CONTANS® (Prophyta, Germany), *Cryphonectria parasitica* (CNICM, France), *Cryptococcus albidus* YIELD PLUS® (Anchor Bio-Technologies, South Africa), *Fusarium oxysporum* BIOFOX® (from S.I.A.P.A., Italy) and FUSACLEAN® (Natural Plant Protection, France), *Metschnikowia fructicola* SHEMER® (Agrogreen, Israel), *Microdochium dimerum* ANTIBOT® (Agrauxine, France), *Muscodor albus* NRRL 30547, *Muscodor roseus* NRRL 30548, *Phlebiopsis gigantea* ROTSOP® (Verdera, Finland), *Pseudozyma flocculosa* SPORODEX® (Plant Products Co. Ltd., Canada), *Pythium oligandrum* DV74 (POLYVERSUM®, Remeslo SSRO, Biopreparaty, Czech Rep.), *Reynoutria sachlinensis* (e.g., REGALIA® from Marrone BioInnovations, USA), *Streptomyces* NRRL B-30145, *Streptomyces* M1064, *Streptomyces galbus* NRRL 30232, *Streptomyces lydicus* WYEC 108 (ATCC 55445), *Streptomyces violaceusniger* YCED 9 (ATCC 55660; DE-THATCH-9®, DECOMP-9® and THATCH CONTROL®, Idaho Research Foundation, USA), *Streptomyces* WYE 53 (ATCC 55750; DE-THATCH-9®, DECOMP-9® and THATCH CONTROL®, Idaho Research Foundation, USA), *Talaromyces flavus* V117b (PROTUS®, Prophyta, Germany), *Trichoderma* asperellum SKT-1 (ECO-HOPE®, Kumiai Chemical Industry Co., Ltd., Japan), *Trichoderma atroviride* LC52 (SENTINEL®, Agrimm Technologies Ltd, NZ), *Trichoderma harzianum* T-22 (PLANTSHIELD®, der Firma BioWorks Inc., USA), *Trichoderma harzianum* TH-35 (ROOT PRO®, from Mycontrol Ltd., Israel), *Trichoderma harzianum* T-39 (TRICHODEX®, Mycontrol Ltd., Israel; *TRICHODERMA* 2000®, Makhteshim Ltd., Israel), *Trichoderma harzianum* ICC012 and *Trichoderma viride* TRICHOPEL (Agrimm Technologies Ltd, NZ), *Trichoderma harzianum* ICC012 and *Trichoderma viride* ICC080 (REMEDIER® WP, Isagro Ricerca, Italy), *Trichoderma polysporum* and *Trichoderma harzianum* (BINAB®, BINAB Bio-Innovation AB, Sweden), *Trichoderma stromaticum* TRICOVAB® (C.E.P.L.A.C., Brazil), *Trichoderma virens* GL-21 (SOILGARD®, Certis LLC, USA), *Trichoderma virens* G1-3, ATCC 57678, *Trichoderma virens* G1-21 (Thermo Trilogy Corporation, Wasco, CA), *Trichoderma virens* G1-3 and *Bacillus amyloliquefaciens* FZB2, *Trichoderma virens* G1-3 and *Bacillus amyloliquefaciens* NRRL B-50349, *Trichoderma virens* G1-3 and *Bacillus amyloliquefaciens* TJ1000, *Trichoderma virens* G1-21 and *Bacillus amyloliquefaciens* FZB24, *Trichoderma virens* G1-21 and *Bacillus amyloliquefaciens* NRRL B-50349, *Trichoderma virens* G1-21 and *Bacillus amyloliquefaciens* TJ1000, *Trichoderma viride* TRIECO® (Ecosense Labs. (India) Pvt. Ltd., Indien, BIO-CURE® F from T. Stanes & Co. Ltd., Indien), *Trichoderma viride* TV1 (Agribiotec srl, Italy), *Trichoderma viride* ICC080, and/or *Ulocladium oudemansii* HRU3 (BOTRY-ZEN®, Botry-Zen Ltd, NZ)), and combinations thereof.

Compositions in some embodiments may comprise one or more biologically active ingredients. Non-limiting examples of biologically active ingredients include plant growth regulators, plant signal molecules, growth enhancers, microbial stimulating molecules, biomolecules, soil amendments, nutrients, plant nutrient enhancers, etc., such as lipo-chitooligosaccharides (LCOs), chitooligosaccharides (COs), chitinous compounds, flavonoids, jasmonic acid or derivatives thereof (e.g., jasmonates), cytokinins, auxins, gibberellins, absiscic acid, ethylene, brassinosteroids, salicylates, macro- and micronutrients, linoleic acid or derivatives thereof, linolenic acid or derivatives thereof, karrikins, etc.) and beneficial microorganisms (e.g., *Rhizobium* spp., *Bradyrhizobium* spp., *Sinorhizobium* spp., *Azorhizobium* spp., *Glomus* spp., *Gigaspora* spp., *Hymenoscyphous* spp., *Oidiodendron* spp., *Laccaria* spp., *Pisolithus* spp., *Rhizopogon* spp., *Scleroderma* spp., *Rhizoctonia* spp., *Acinetobacter* spp., *Arthrobacter* spp, *Arthrobotrys* spp., *Aspergillus* spp., *Azospirillum* spp, *Bacillus* spp, *Burkholderia* spp., *Candida* spp., *Chryseomonas* spp., *Enterobacter* spp., *Eupenicillium* spp., *Exiguobacterium* spp., *Klebsiella* spp., *Kluyvera* spp., *Microbacterium* spp., *Mucor* spp., *Paecilomyces* spp., *Paenibacillus* spp., *Penicillium* spp., *Pseudomonas* spp., *Serratia* spp., *Stenotrophomonas* spp., *Streptomyces* spp., *Streptosporangium* spp., *Swaminathania* spp., *Thiobacillus* spp., *Torulospora* spp., *Vibrio* spp., *Xanthobacter* spp., *Xanthomonas* spp., etc.), and combinations thereof.

Compositions in some embodiments may comprise one or more lipo-chitooligosaccharides (LCOs), chitooligosaccharides (COs), and/or chitinous compounds. LCOs, sometimes referred to as symbiotic nodulation (Nod) signals (or Nod factors) or as Myc factors, consist of an oligosaccharide backbone of β-1,4-linked N-acetyl-D-glucosamine ("GlcNAc") residues with an N-linked fatty acyl chain condensed at the non-reducing end. As understood in the art, LCOs differ in the number of GlcNAc residues in the backbone, in the length and degree of saturation of the fatty acyl chain and in the substitutions of reducing and non-reducing sugar residues. See, e.g., Denarie et al., Ann. Rev. Biochem. 65:503 (1996); Diaz et al., Mol. Plant-Microbe Interactions 13:268 (2000); Hungria et al., Soil Biol. Biochem. 29:819 (1997); Hamel et al., Planta 232:787 (2010); and Prome et al., Pure & Appl. Chem. 70(1):55 (1998), the contents and disclosures of which are incorporated herein by reference.

LCOs may be synthetic or obtained from any suitable source. See, e.g., WO 2005/063784, WO 2007/117500 and WO 2008/071674, the contents and disclosures of which are incorporated herein by reference. In some aspects, a synthetic LCO may have the basic structure of a naturally occurring LCO but contains one or more modifications or substitutions, such as those described in Spaink, Crit. Rev. Plant Sci. 54:257 (2000). LCOs and precursors for the construction of LCOs (e.g., COs, which may themselves be useful as a biologically active ingredient) can be synthesized by genetically engineered organisms. See, e.g., Samain et al., *Carbohydrate Res.* 302:35 (1997); Cottaz et al., *Meth. Eng.* 7(4):311 (2005); and Samain et al., *J. Biotechnol.* 72:33 (1999) (e.g., FIG. 1 therein, which shows structures of COs that can be made recombinantly in *E. coli* harboring different combinations of genes nodBCHL), the contents and disclosures of which are incorporated herein by reference.

LCOs (and derivatives thereof) may be included or utilized in compositions of embodiments of the present invention in various forms of purity and can be used alone or in the form of a culture of LCO-producing bacteria or fungi. For example, OPTIMIZE® (commercially available from Monsanto Company (St. Louis, MO)) contains a culture of *Bradyrhizobium japonicum* that produces LCO. Methods to provide substantially pure LCOs include removing the microbial cells from a mixture of LCOs and the microbe, or continuing to isolate and purify the LCO molecules through LCO solvent phase separation followed by HPLC chromatography as described, for example, in U.S. Pat. No. 5,549, 718. Purification can be enhanced by repeated HPLC and the purified LCO molecules can be freeze-dried for long-term storage. According to some embodiments, the LCO(s) included in compositions of the present disclosure is/are at least 0.1%, 0.5%, 1%, 2%, 3%, 4%, 5%, 10%, 15%, 20%, 25%, 30%, 35%, 40%, 45%, 50%, 55%, 60%, 65%, 70%, 75%, 80%, 85%, 90%, 91%, 92%, 93%, 94%, 95%, 96%, 97%, 98%, 99% or 100% pure. Compositions and methods in some embodiments may comprise analogues, derivatives, hydrates, isomers, salts and/or solvates of LCOs. LCOs may be incorporated into compositions of the present disclosure in any suitable amount(s)/concentration(s). For example, compositions of the present disclosure comprise about $1 \times 10^{-20}$ M to about $1 \times 10^{-1}$ M LCO(s). For example, compositions of the present disclosure can comprise about $1 \times 10^{-20}$ M, $1 \times 10^{-19}$ M, $1 \times 10^{-18}$ M, $1 \times 10^{-17}$ M, $1 \times 10^{-16}$ M, $1 \times 10^{-15}$ M, $1 \times 10^{-14}$ M, $1 \times 10^{-13}$ M, $1 \times 10^{-12}$ M, $1 \times 10^{-11}$ M, $1 \times 10^{-10}$ M, $1 \times 10^{-9}$ M, $1 \times 10^{-8}$ M, $1 \times 10^{-7}$ M, $1 \times 10^{-6}$ M, $1 \times 10^{-5}$ M, $1 \times 10^{-4}$ M, $1 \times 10^{-3}$ M, $1 \times 10^{-2}$ M, $1 \times 10^{-1}$ M of one or more LCOs. In an aspect, the LCO concentration is $1 \times 10^{-14}$ M to $1 \times 10^{-5}$ M, $1 \times 10^{-12}$ M to $1 \times 10^{-6}$ M, or $1 \times 10^{-10}$ M to $1 \times 10^{-7}$ M. In an aspect, the LCO concentration is $1 \times 10^{-14}$ M to $1 \times 10^{-5}$M, $1 \times 10^{-12}$ M to $1 \times 10^{-6}$ M, or $1 \times 10^{-10}$ M to $1 \times 10^{-7}$ M. The amount/concentration of LCO may be an amount effective to impart a positive trait or benefit to a plant, such as to enhance the disease resistance, growth and/or yield of the plant to which the composition is applied. According to some embodiments, the LCO amount/concentration is not effective to enhance the yield of the plant without beneficial contributions from one or more other constituents of the composition, such as CO and/or one or more pesticides.

Compositions in some embodiments may comprise any suitable COs, perhaps in combination with one or more LCOs. COs differ from LCOs in that they lack the pendant fatty acid chain that is characteristic of LCOs. COs, sometimes referred to as N-acetylchitooligosaccharides, are also composed of GlcNAc residues but have side chain decorations that make them different from chitin molecules [$(C_8H_{13}NO_5)_n$, CAS No. 1398-61-4] and chitosan molecules [$(C_5H_{11}NO_4)_n$, CAS No. 9012-76-4]. See, e.g., D'Haeze et al., *Glycobiol.* 12(6):79R (2002); Demont-Caulet et al., *Plant Physiol.* 120(1):83 (1999); Hanel et al., *Planta* 232: 787 (2010); Muller et al., *Plant Physiol.* 124:733 (2000); Robina et al., *Tetrahedron* 58:521-530 (2002); Rouge et al., Docking of Chitin Oligomers and Nod Factors on Lectin Domains of the LysM-RLK Receptors in the Medicago-Rhizobium Symbiosis, in The Molecular Immunology of Complex Carbohydrates-3 (Springer Science, 2011); Van der Holst et al., *Curr. Opin. Struc. Biol.* 11:608 (2001); and Wan et al., *Plant Cell* 21:1053 (2009), the contents and disclosures of which are incorporated by reference. COs may be obtained from any suitable source. For example, the CO may be derived from an LCO. For example, in an aspect, compositions comprise one or more COs derived from an LCO obtained (i.e., isolated and/or purified) from a strain of *Azorhizobium, Bradyrhizobium* (e.g., *B. japonicum*), *Mesorhizobium, Rhizobium* (e.g., *R. leguminosarum*), *Sinorhizobium* (e.g., *S. meliloti*), or mycorhizzal fungi (e.g., *Glomus intraradicus*). Alternatively, the CO may be synthetic. Methods for the preparation of recombinant COs are known in the art. See, e.g., Cottaz et al., *Meth. Eng.* 7(4):311 (2005); Samain et al., *Carbohydrate Res.* 302:35 (1997); and Samain et al., *J Biotechnol.* 72:33 (1999), the contents and disclosures of which are incorporated herein by reference.

COs (and derivatives thereof) may be included or utilized in compositions of embodiments of the present invention in various forms of purity and can be used alone or in the form of a culture of CO-producing bacteria or fungi. According to some embodiments, the CO(s) included in compositions may be at least 0.1%, 0.5%, 1%, 2%, 3%, 4%, 5%, 6%, 7%, 8%, 9%, 10%, 15%, 20%, 30%, 40%, 50%, 60%, 70%, 75%, 80%, 85%, 90%, 91%, 92%, 93%, 94%, 95%, 96%, 97%, 98%, 99%, 99.5% or more pure. It is to be understood that compositions and methods of the present disclosure can comprise hydrates, isomers, salts and/or solvates of COs. COs in some embodiments may be incorporated into compositions in any suitable amount(s)/concentration(s). For example, compositions in some embodiments may comprise about $1\times10^{-20}$ M to about $1\times10^{-1}$ M COs, such as about $1\times10^{-20}$ M, $1\times10^{-19}$ M, $1\times10^{-18}$ M, $1\times10^{-17}$ M, $1\times10^{-16}$ M, $1\times10^{-15}$ M, $1\times10^{-14}$ M, $1\times10^{-13}$ M, $1\times10^{-12}$ M, $1\times10^{-11}$ M, $1\times10^{-10}$ M, $1\times10^{-9}$ M, $1\times10^{-8}$ M, $1\times10^{-7}$ M, $1\times10^{-6}$ M, $1\times10^{-5}$ M, $1\times10^{-4}$ M, $1\times10^{-3}$ M, $1\times10^{-2}$ M, or $1\times10^{-1}$ M of one or more COs. For example, the CO concentration may be $1\times10^{-14}$ M to $1\times10^{-5}$ M, $1\times10^{-12}$ M to $1\times10^{-6}$ M, or $1\times10^{-10}$ M to $1\times10^{-7}$ M. The amount/concentration of CO may be an amount effective to impart or confer a positive trait or benefit to a plant, such as to enhance the soil microbial environment, nutrient uptake, or increase the growth and/or yield of the plant to which the composition is applied. Compositions in some embodiments may comprise one or more suitable chitinous compounds, such as, for example, chitin (IUPAC: N-[5-[[3-acetylamino-4,5-dihydroxy-6-(hydroxymethyl)oxan-2yl]methoxymethyl]-2-[[5-acetylamino-4,6-dihydroxy-2-(hydroxymethyl)oxan-3-yl] methoxymethyl]-4-hydroxy-6-(hydroxymethyl)oxan-3-ys] ethanamide), chitosan (IUPAC: 5-amino-6-[5-amino-6-[5-amino-4,6-dihydroxy-2(hydroxymethyl)oxan-3-yl]oxy-4-hydroxy-2-(hydroxymethyl)oxan-3-yl]oxy-2 (hydroxymethyl)oxane-3,4-diol), and isomers, salts and solvates thereof.

Chitins and chitosans, which are major components of the cell walls of fungi and the exoskeletons of insects and crustaceans, are composed of GlcNAc residues. Chitins and chitosans may be obtained commercially or prepared from insects, crustacean shells, or fungal cell walls. Methods for the preparation of chitin and chitosan are known in the art. See, e.g., U.S. Pat. No. 4,536,207 (preparation from crustacean shells) and U.S. Pat. No. 5,965,545 (preparation from crab shells and hydrolysis of commercial chitosan); and Pochanavanich et al., *Lett. Appl. Microbiol.* 35:17 (2002) (preparation from fungal cell walls).

Deacetylated chitins and chitosans may be obtained that range from less than 35% to greater than 90% deacetylation and cover a broad spectrum of molecular weights, e.g., low molecular weight chitosan oligomers of less than 15 kD and chitin oligomers of 0.5 to 2 kD; "practical grade" chitosan with a molecular weight of about 15 kD; and high molecular weight chitosan of up to 70 kD. Chitin and chitosan compositions formulated for seed treatment are commercially available. Commercial products include, for example, ELEXA® (Plant Defense Boosters, Inc.) and BEYOND™ (Agrihouse, Inc.).

Compositions in some embodiments may comprise one or more suitable flavonoids, including, but not limited to, anthocyanidins, anthoxanthins, chalcones, coumarins, flavanones, flavanonols, flavans and isoflavonoids, as well as analogues, derivatives, hydrates, isomers, polymers, salts and solvates thereof. Flavonoids are phenolic compounds having the general structure of two aromatic rings connected by a three-carbon bridge. Classes of flavonoids are known in the art. See, e.g., Jain et al., *J. Plant Biochem. & Biotechnol.* 11:1 (2002); and Shaw et al., *Environ. Microbiol.* 11:1867 (2006), the contents and disclosures of which are incorporated herein by reference. Several flavonoid compounds are commercially available. Flavonoid compounds may be isolated from plants or seeds, e.g., as described in U.S. Pat. Nos. 5,702,752; 5,990,291; and 6,146,668. Flavonoid compounds may also be produced by genetically engineered organisms, such as yeast, See, e.g. Ralston et al., *Plant Physiol.* 137:1375 (2005).

According to embodiments, compositions may comprise one or more flavanones, such as one or more of butin, eriodictyol, hesperetin, hesperidin, homoeriodictyol, isosakuranetin, naringenin, naringin, pinocembrin, poncirin, sakuranetin, sakuranin, and/or sterubin, one or more flavanonols, such as dihydrokaempferol and/or taxifolin, one or more flavans, such as one or more flavan-3-ols (e.g., catechin (C), catechin 3-gallate (Cg), epicatechins (EC), epigallocatechin (EGC) epicatechin 3-gallate (ECg), epigallcatechin 3-gallate (EGCg), epiafzelechin, fisetinidol, gallocatechin (GC), gallcatechin 3-gallate (GCg), guibourtinidol, mesquitol, robinetinidol, theaflavin-3-gallate, theaflavin-3'-gallate, theflavin-3,3'-digallate, thearubigin), flavan-4-ols (e.g., apiforol and/or luteoforol) and/or flavan-3, 4-diols (e.g., leucocyanidin, leucodelphinidin, leucofisetinidin, leucomalvidin, luecopelargonidin, leucopeonidin, leucorobinetinidin, melacacidin and/or teracacidin) and/or dimers, trimers, oligomers and/or polymers thereof (e.g., one or more proanthocyanidins), one or more isoflavonoids, such as one or more isoflavones or flavonoid derivatives (e.g, biochanin A, daidzein, formononetin, genistein and/or glycitein), isoflavanes (e.g., equol, ionchocarpane and/or laxifloorane), isoflavandiols, isoflavenes (e.g., glabrene, haginin D and/or 2-methoxyjudaicin), coumestans (e.g., coumestrol, plicadin and/or wedelolactone), pterocarpans, roetonoids, neoflavonoids (e.g, calophyllolide, coutareagenin, dalbergichromene, dalbergin, nivetin), and/or pterocarpans (e.g., bitucarpin A, bitucarpin B, erybraedin A, erybraedin B, erythrabyssin II, erthyrabissin-1, erycristagallin, glycinol, glyceollidins, glyceollins, glycyrrhizol, maackiain, medicarpin, morisianine, orientanol, phaseolin, pisatin, striatine, trifolirhizin), and combinations thereof. Flavonoids and their derivatives may be included in compositions in any suitable form, including, but not limited to, polymorphic and crystalline forms. Flavonoids may be included in compositions in any suitable amount(s) or concentration(s). The amount/concentration of a flavonoid(s) may be an amount effective to impart a benefit to a plant, which may be indirectly through activity on soil microorganisms or other means, such as to enhance plant nutrition and/or yield. According to some embodiments, a flavonoid amount/concentration may not be effective to enhance the nutrition or yield of the plant without the beneficial contributions from one or more other ingredients of the composition, such as LCO, CO, and/or one or more pesticides.

Compositions in some embodiments may comprise one or more suitable non-flavonoid nod-gene inducer(s), including, but not limited to, jasmonic acid ([1R-[1α,2β(Z)]]-3-oxo-2-(pentenyl)cyclopentaneacetic acid; JA), linoleic acid ((Z,Z)-9,12-Octadecadienoic acid) and/or linolenic acid ((Z,Z,Z)-9,12,15-octadecatrienoic acid), and analogues, derivatives, hydrates, isomers, polymers, salts and solvates thereof. Jasmonic acid and its methyl ester, methyl jasmonate (MeJA), collectively known as jasmonates, are octadecanoid-based compounds that occur naturally in some plants (e.g., wheat), fungi (e.g., *Botryodiplodia theobromae, Gibrella fujikuroi*), yeast (e.g., *Saccharomyces cerevisiae*) and bacteria (e.g., *Escherichia coli*). Linoleic acid and linolenic acid may be produced in the course of the biosynthesis of jasmonic acid. Jasmonates, linoleic acid and linolenic acid (and their derivatives) are reported to be inducers of nod gene expression or LCO production by rhizobacteria. See, e.g., Mabood et al. Plant Physiol. Biochem. 44(11):759 (2006); Mabood et al., Agr. J. 98(2):289 (2006); Mabood et al., Field Crops Res.95(2-3):412 (2006); and Mabood & Smith, *Linoleic and linolenic acid induce the expression of nod genes in Bradyrhizobium japonicum* USDA 3, Plant Biol. (2001).

Derivatives of jasmonic acid, linoleic acid, and linolenic acid that may be included or used in compositions in some embodiments include esters, amides, glycosides and salts thereof. Representative esters are compounds in which the carboxyl group of linoleic acid, linolenic acid, or jasmonic acid has been replaced with a —COR group, where R is an —OR$^1$ group, in which R$^1$ is: an alkyl group, such as a $C_1$-$C_8$ unbranched or branched alkyl group, e.g., a methyl, ethyl or propyl group; an alkenyl group, such as a $C_2$-$C_8$ unbranched or branched alkenyl group; an alkynyl group, such as a $C_2$-$C_8$ unbranched or branched alkynyl group; an aryl group having, for example, 6 to 10 carbon atoms; or a heteroaryl group having, for example, 4 to 9 carbon atoms, wherein the heteroatoms in the heteroaryl group can be, for example, N, O, P, or S. Representative amides are compounds in which the carboxyl group of linoleic acid, linolenic acid, or jasmonic acid has been replaced with a —COR group, where R is an NR$^2$R$^3$ group, in which R$^2$ and R$^3$ are each independently: a hydrogen; an alkyl group, such as a $C_1$-$C_8$ unbranched or branched alkyl group, e.g., a methyl, ethyl or propyl group; an alkenyl group, such as a $C_2$-$C_8$ unbranched or branched alkenyl group; an alkynyl group, such as a $C_2$-$C_8$ unbranched or branched alkynyl group; an aryl group having, for example, 6 to 10 carbon atoms; or a heteroaryl group having, for example, 4 to 9 carbon atoms, wherein the heteroatoms in the heteroaryl group can be, for example, N, O, P, or S. Esters may be prepared by known methods, such as acid-catalyzed nucleophilic addition, wherein the carboxylic acid is reacted with an alcohol in the presence of a catalytic amount of a mineral acid. Amides may also be prepared by known methods, such as by reacting the carboxylic acid with the appropriate amine in the presence of a coupling agent, such as dicyclohexyl carbodiimide (DCC), under neutral conditions. Suitable salts of linoleic acid, linolenic acid and jasmonic acid include, for example, base addition salts. The bases that may be used as reagents to prepare metabolically acceptable base salts of these compounds include those derived from cations such as alkali metal cations (e.g., potassium and sodium) and alkaline earth metal cations (e.g., calcium and magnesium). These salts may be readily prepared by mixing a solution of linoleic acid, linolenic acid, or jasmonic acid with a solution of the base. The salts may be precipitated from solution and collected by filtration, or may be recovered by other means such as by evaporation of the solvent.

Non-flavonoid nod-gene inducers may be incorporated into compositions in any suitable amount(s)/concentration(s). For example, the amount/concentration of non-flavonoid nod-gene inducers may be an amount effective to impart or confer a positive trait or benefit to a plant, such as to enhance the disease resistance, growth and/or yield of the plant to which the composition is applied. According to some embodiments, the amount/concentration of non-flavonoid nod-gene inducers may not be effective to enhance the growth and/or yield of the plant without beneficial contributions from one or more other ingredients of the composition, such as a LCO, CO and/or one or more pesticides.

Compositions in some embodiments may comprise karrakins, including but not limited to 2H-furo[2,3-c]pyran-2-ones, as well as analogues, derivatives, hydrates, isomers, polymers, salts and solvates thereof. Examples of biologically acceptable salts of karrakins include acid addition salts formed with biologically acceptable acids, examples of which include hydrochloride, hydrobromide, sulphate or bisulphate, phosphate or hydrogen phosphate, acetate, benzoate, succinate, fumarate, maleate, lactate, citrate, tartrate, gluconate; methanesulphonate, benzenesulphonate and p-toluenesulphonic acid. Additional biologically acceptable metal salts may include alkali metal salts, with bases, examples of which include the sodium and potassium salts. Karrakins may be incorporated into compositions of embodiments of the present invention in any suitable amount(s) or concentration(s). For example, the amount/concentration of a karrakin may be an amount or concentration effective to impart or confer a positive trait or benefit to a plant, such as to enhance the disease resistance, growth and/or yield of the plant to which the composition is applied. In an aspect, a karrakin amount/concentration may not be effective to enhance the disease resistance, growth and/or yield of the plant without beneficial contributions from one or more other ingredients of the composition, such as a LCO, CO and/or one or more pesticides.

Generally, the seed treatment compositions described herein can also comprise any adjuvants, excipients, or other desirable components known in the art. For example, in some embodiments, the treatment composition further comprises a surfactant.

Examples of anionic surfactants include alkyl sulfates, alcohol sulfates, alcohol ether sulfates, alpha olefin sulfonates, alkylaryl ether sulfates, arylsulfonates, alkylsulfonates, alkylaryl sulfonates, sulfosuccinates, mono- or diphosphate esters of polyalkoxylated alkyl alcohols or alkyl phenols, mono- or disulfosuccinate esters of alcohols or polyalkoxylated alkanols, alcohol ether carboxylates, phenol ether carboxylates. In one embodiment, the surfactant is an alkylaryl sulfonate.

Non-limiting examples of commercially available anionic surfactants include sodium dodecylsulfate (Na-DS, SDS), MORWET D-425 (a sodium salt of alkyl naphthalene sulfonate condensate, available from Akzo Nobel), MORWET D-500 (a sodium salt of alkyl naphthalene sulfonate condensate with a block copolymer, available from Akzo Nobel), sodium dodecylbenzene sulfonic acid (Na-DBSA) (available from Sigma Aldrich), diphenyloxide disulfonate, naphthalene formaldehyde condensate, DOWFAX (available from Dow), dihexylsulfosuccinate, and dioctylsulfosuccinate, alkyl naphthalene sulfonate condensates, and salts thereof.

Examples of non-ionic surfactants include sorbitan esters, ethoxylated sorbitan esters, alkoxylated alkylphenols, alkoxylated alcohols, block copolymer ethers, and lanolin derivatives. In accordance with one embodiment, the surfactant comprises an alkylether block copolymer.

Non-limiting examples of commercially available non-ionic surfactants include SPAN 20, SPAN 40, SPAN 80, SPAN 65, and SPAN 85 (available from Sigma Aldrich); TWEEN 20, TWEEN 40, TWEEN 60, TWEEN 80, and TWEEN 85 (available from Sigma Aldrich); IGEPAL CA-210, IGEPAL CA-520, IGEPAL CA-720, IGEPAL CO-210, IGEPAL CO-520, IGEPAL CO-630, IGEPAL CO-720, IGEPAL CO-890, and IGEPAL DM-970 (available from Sigma Aldrich); TRITON X-100 (available from Sigma Aldrich); BRIJ S10, BRIJ S20, BRIJ 30, BRIJ 52, BRIJ 56, BRIJ 58, BRIJ 72, BRIJ 76, BRIJ 78, BRIJ 92V, BRIJ 97, and BRIJ 98 (available from Sigma Aldrich); PLURONIC L-31, PLURONIC L-35, PLURONIC L-61, PLURONIC L-81, PLURONIC L-64, PLURONIC L-121, PLURONIC 10R5, PLURONIC 17R4, and PLURONIC 31R1 (available from Sigma Aldrich); Atlas G-5000 and Atlas G-5002L (available from Croda); ATLOX 4912 and ATLOX 4912-SF (available from Croda); SOLUPLUS (available from BASF); LANEXOL AWS (available from Croda); TRITON AG-98 (available from Rohm and Haas Co.); and Silwet L-77 (available from Momentive).

Non-limiting examples of cationic surfactants include mono alkyl quaternary amine, fatty acid amide surfactants, amidoamine, imidazoline, and polymeric cationic surfactants.

In some embodiments, the treatment composition comprises a co-solvent in addition to water. Non-limiting examples of co-solvents that can be used include ethyl lactate, methyl soyate/ethyl lactate co-solvent blends (e.g., STEPOSOL, available from Stepan), isopropanol, acetone, 1,2-propanediol, n-alkylpyrrolidones (e.g., the AGSOLEX series, available from ISP), a petroleum based-oil (e.g., AROMATIC series and SOLVESSO series available from Exxon Mobil), isoparaffinic fluids (e.g. ISOPAR series, available from Exxon Mobil), cycloparaffinic fluids (e.g. NAPPAR 6, available from Exxon Mobil), mineral spirits (e.g. VARSOL series available from Exxon Mobil), and mineral oils (e.g., paraffin oil).

Examples of commercially available organic solvents include pentadecane, ISOPAR M, ISOPAR V, and ISOPAR L (available from Exxon Mobil).

The dry seed treatment may also comprise a seed-finishing agent. Non-limiting examples of seed-finishing agents include talc, graphite, mica, effect pigments, cellulose, sugar, silica, starch, clay, and combinations thereof. For example, the dry seed treatment can include flow agents, such as waxes and polymers.

In some instances, the treatment composition comprises a flowability agent to improve the lubricity of the treated seeds. The flowability agent may comprise one or more liquid lubricants, solid lubricants, liquid emulsions, or suspensions of solid lubricants. Non-limiting examples of flowability agents include, for example, lubricants such as fats and oils, natural and synthetic waxes, graphite, talc, fluoropolymers (e.g., polytetrafluoroethylene), and solid lubricants such as molybdenum disulfide and tungsten disulfide.

In some instances, the flowability agent comprises a wax material. Non-limiting examples of wax materials that can be incorporated into the liquid seed treatment composition include plant and animal-derived waxes such as carnauba wax, candelilla wax, ouricury wax, beeswax, spermaceti, and petroleum derived waxes, such as paraffin wax. For example, in some instances, the flowability agent comprises carnauba wax.

In some instances, the flowability agent comprises an oil. For example, the flowability agent may comprise soybean oil.

Non-limiting examples of commercially available wax materials suitable for use as flowability agents include AQUAKLEAN 418 supplied by Micro Powders, Inc. (an anionic aqueous emulsion comprising extra light carnauba wax at 35% solids content).

The flowability agent can be incorporated into the liquid seed treatment composition through any means known in the art. For example, in some instances, flowability agent is in the form of an emulsion, wherein an organic phase comprising the flowability agent is dispersed throughout a continuous aqueous phase.

Typically, the liquid seed treatment composition is in the form of an aqueous slurry comprising one or more dispersed solid phases and a continuous aqueous phase. In some instances, the liquid seed treatment composition further comprises a dispersed liquid organic phase. For example, the composition may be in the form of an aqueous suspension concentrate.

Seed Treatment Apparatus

Figure 1B:
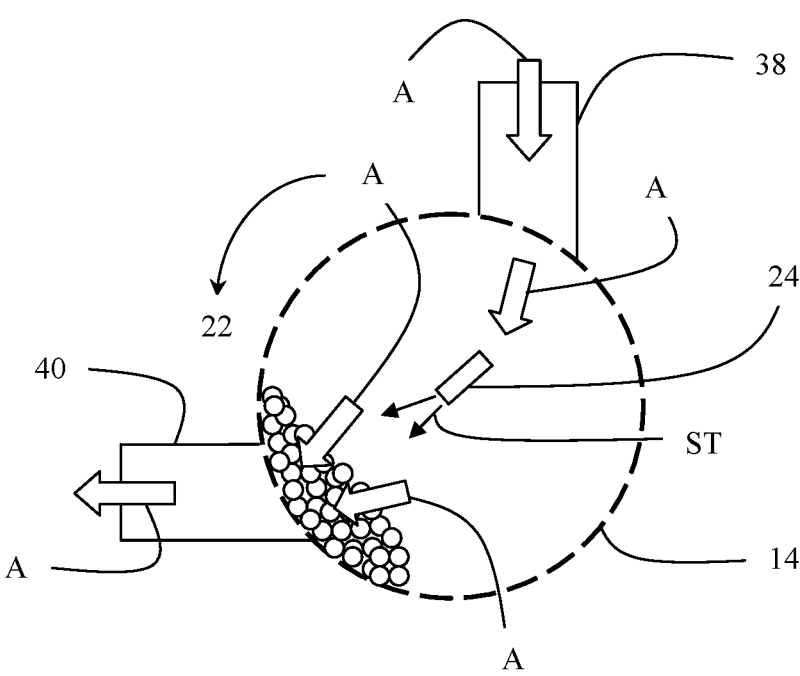
FIG. 1B is a side schematic view of the seed treatment apparatus.

Referring to FIGS. 1A and 1B, an example of a seed treatment apparatus with integrated drying constructed according to the teachings of the present disclosure is generally indicated at reference number 10. The seed treatment apparatus comprises a seed treater, generally indicated at 12. In the illustrated embodiment, the seed treater 12 is a drum coater including a perforated treater drum 14. The treater drum 14 includes a drum body that is selectively rotatable 360 degrees about an axis (e.g., a horizontal axis) via a mover, such as a motor or other drive mechanism. The drum body includes a circumferential wall extending about the axis. One or more openings or ports in the circumferential wall are selectively closeable and openable via a port door 16 secured to the drum body. Seeds are delivered or loaded into the drum body through the port(s) when the port door 16 is open and drum body is in a loading angular position relative to the axis, in which the port(s) are at an upper position (as shown in FIG. 1A). A loading chute 18 is disposed above the treater drum 14 and is in communication with the port(s) when the port door 16 is open and the drum body is in the loading angular position to deliver seeds through the port(s) and into the treater drum, as shown by arrow 20 in FIG. 1A. During seed treatment, the port door 16 is closed to retain the seeds in the treater drum 14, and the treater drum 14 is continuously rotated 360 degrees about the axis, as shown by arrow 22 in FIG. 1A. The seeds are unloaded from the drum body through the port(s) when the port door 16 is open and drum body is in an unloading angular position relative to the axis, in which the port(s) are at a lower position (e.g., 180 degrees offset from the loading position). An unloading chute 19 is disposed below the treater drum 14 and is in communication with the port(s) when the port door 16 is open and the drum body is in the unloading angular position to deliver seeds through the port(s) and out of the treater drum, as shown by arrow 34 in FIG. 1A. The seed treater 12 may be rotated clockwise or counterclockwise or may be agitated through other means, such as by jogging. Jogging can help the seeds to discharge.

Seeds can be treated with liquid seed treatment or dry seed treatment via a seed treatment delivery system. The seed treatment delivery system includes spray bars 24, for example, that are fluidly connectable to source(s) of seed treatment. The spray bars 24 have nozzles appropriate for liquid and/or dry powder seed treatment application as well as spray nozzles for clean in place operations. For example, there can be one or more spray bars with nozzles for liquid seed treatment application, one or more spray bars with nozzles for dry seed treatment application, and/or one or more spray bars with nozzles equipped for clean in place operations. The number of nozzles can vary depending on the size of the seed treater 12. For example, the spray bars may have 2 to 11 nozzles per spray bar. The number of nozzles per spray bar may vary provided that there are a sufficient amount of nozzles at an appropriate distance from one another to allow for even and complete coating of the seeds. The number of spray bars 24 can also vary depending on the size and length of the seed treater 12. Liquid seed treatment and/or dry seed treatment can enter the spray bars 24 via seed treatment connection ports 26. The number of connect ports 26 can vary depending on the number of spray bars 24. Liquid seed treatment and/or dry seed treatment can then be applied to loaded seeds 28.

Referring to FIG. 1B, the seed treatment apparatus 10 is also capable of drying the wetted seeds simultaneously with application of the seed treatment. In this regard, the seed treatment apparatus 10 is considered to have an integrated drying system. In some embodiments, the drying of the wetted seeds occurs through injection of air A into the seed treatment apparatus. Air A can be delivered through an inlet duct 38 of the seed treatment apparatus and into the treater drum 14 through the perforations in the drum. For example, a blower or other air mover may be in fluid communication with the inlet duct 38. The wetted seeds are contacted with the air A to facilitate evaporation and drying of the seed. The air injected through drum perforations 30 exits the seed treater 12 through drum perforations 32 and into an outlet duct 40. In some embodiments, the outlet duct 40 is disposed in opposing relationship with the seeds so that air A must pass through the seeds in the drum to enter the outlet duct. A vacuum or other air mover may be in communication with the outlet duct 40 to draw air A from within the drum 14, through the seeds in the drum, and into the outlet duct.

The air A with which the seeds are contacted may be ambient air, dehumidified air, heated air, or a combination thereof. The type of air A used may be dependent on the type and quantity of seed treated as well as the type and quantity of seed treatment. The injection of air A can be stopped during the application of the liquid seed treatment and/or dry seed treatment. In some embodiments, in order to decrease the total cycle time, the air flow can remain on but is diverted from entry into the seed treatment apparatus. In this way, the air flow does not need to be completely stopped during seed treatment application and allowed to return to the appropriate speed before drying can resume. The air flow can be diverted and recycled into the seed treatment apparatus once air flow into the seed treatment apparatus is resumed.

Heated air may reduce drying time of the wetted seeds. For example, the heated air may have a temperature of from about 25° C. to about 100° C., from about 25° C. to about 75° C., from about 30° C. to about 60° C., from about 30° C. to about 50° C., or from about 40° C. to about 50° C. In preferred embodiments, the heated air is about 45° C. More preferably, the heated air is about 45° C. for corn seed and soybean seed or about 60° C. for cotton seed. The preferred air temperature in a particular application can be dependent on the type of seed treated, the seed treatment, and the amount of liquid seed treatment added.

Increased airflow may also reduce the drying time of the wetted seeds. For example, the airflow may be from about 1 cubic foot (0.03 cubic meters) per minute (cfm) to about 20,000 cfm (566 m³/min), from about 10 cfm (0.28 m³/min) to about 15,000 cfm (425 m³/min), from about 10 cfm (0.28 m³/min) to about 10,0000 cfm (283 m³/min), from about 10 cfm (0.28 m³/min) to about 5,000 cfm (142 m³/min), from about 10 cfm (0.28 m³/min) to about 3,000 cfm (85 m³/min), from about 10 cfm (0.28 m³/min) to about 1,500 cfm (42 m³/min), from about 10 cfm (0.28 m³/min) to about 1,000 cfm (28 m³/min), from about 10 cfm (0.28 m³/min) to about 500 cfm (14 m³/min), from about 10 cfm (0.28 m³/min) to about 250 cfm (7.1 m³/min), from about 10 cfm (0.28 m³/min) to about 100 cfm (2.83 m³/min), from about 25 cfm (0.71 m³/min) to about 100 cfm (2.83 m³/min), from about 50 cfm (1.42 m³/min) to about 100 cfm (2.83 m³/min), or from about 75 cfm (2.12 m³/min) to about 100 cfm (2.83 m³/min). In various embodiments, the airflow is about 100 cfm (2.83 m³/min). Ideal airflow and blower size is generally dependent on the type of seed treated, the seed treatment, the amount of liquid seed treatment added, the amount of liquid seed treatment that must be evaporated, which is a function of the amount of liquid seed treatment added and the amount of seeds to be treated, and the desired drying time, among other factors.

Figure 2:
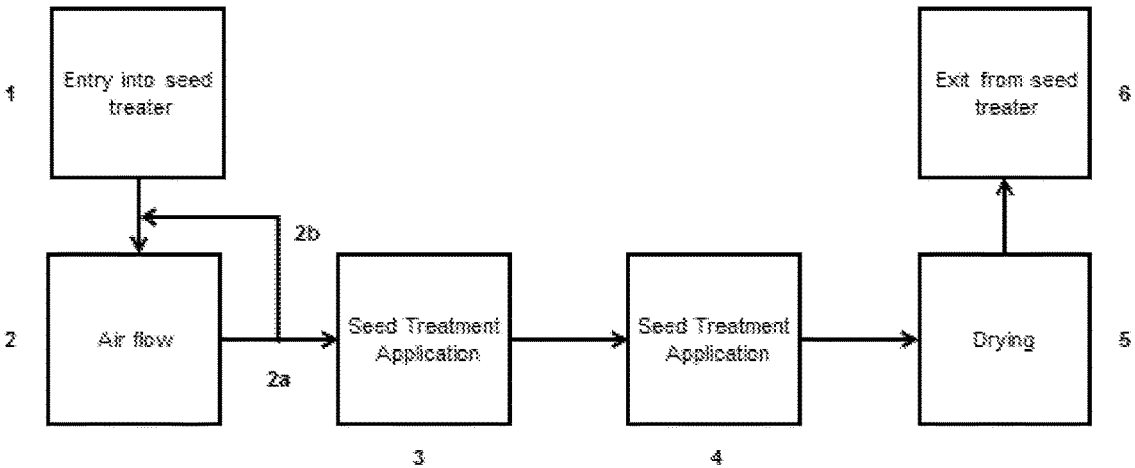
FIG. 2 is a diagram of a process of treating seeds using the seed treatment apparatus having the integrated drying system.

FIG. 2 portrays a method of using the seed treater, as described above, schematically. Each of the steps may be automated, such as through the use of one or more controllers (e.g., a programmable processor and memory) controlling electrical or electromechanical components of the seed treatment apparatus 10. For example, the port door 16 may be opened and closed via an electromechanical actuator coupled to the port door and in communication with the controller(s). The delivery of seeds through the chute 18 may be controlled via an electromechanical actuator in communication with the controller(s). The blower or other air mover may be in communication with the controller(s) for actuation. The motor or other mover for driving rotation of the drum 14 may be in communication with the controller(s) for actuation. Other components of the seed treatment apparatus may also be in communication with the controller(s) for automating operation of the seed treatment apparatus.

Seed treatment begins by providing seed into a seed treatment apparatus (Step 1). Entry can occur through an entrance chute and through the opened port(s) in the seed treater. In preferred embodiments, the seeds enter the seed treatment apparatus through the opened port(s) when the port(s) are at an upper position.

In some embodiments, the blower is turned on and air flow begins (Step 2). At certain stages, the air flow is channeled into the seed treatment apparatus to allow for contact of the air with the seeds (Step 2a). In some embodiments, at various stages—for example, during application of the seed treatment—the air flow is diverted back through the blower so that no air enters the seed treatment apparatus (Step 2b). Preferably, the blower remains on for the entire period that the seeds are present in the seed treatment apparatus to allow for optimal total cycle time.

Application of seed treatment then occurs (Step 3). In some embodiments, seed treatment is applied before air flow begins. In other embodiments, seed treatment is applied after air flow begins. In further embodiments, seed treatment (e.g., dry or powder seed treatment) is applied after air flow begins but while air flow is diverted. In this step, the seed treatment can be liquid seed treatment and/or powder seed treatment.

Optionally, additional seed treatment can be applied after application of the first seed treatment (Step 4). In some embodiments, step 3 comprises application of a liquid seed treatment and step 4 comprises application of a dry seed treatment. In some embodiments, drying of the seed occurs between steps 3 and 4. In various embodiments, liquid seed treatment is applied in step 3, drying occurs, and a separate liquid seed treatment is applied in step 4. In this way, different seed treatments can be layered on the seed. Step 4 can be optionally repeated as many times as desired in order to obtain as many layers of liquid and/or dry seed treatment as desired.

Following application of the seed treatment(s), air flow can remain on, can be diverted back into the seed treatment apparatus, or can be turned on in order to dry the seeds to the desired level of dryness (Step 5). In some embodiments, step 5 is not required as the treated seeds may already be dried to the desired level of dryness immediately following application of the final seed treatment. In other embodiments, the seeds are allowed to tumble or are otherwise agitated during the optional drying period. In further embodiments, the seeds are allowed to tumble or are otherwise agitated and air flow remains off or is diverted during the optional drying period.

Following the optional drying period, the treated seeds are allowed to exit the seed treatment apparatus through the opened port(s) in the seed treater and through an exit chute (Step 6). Preferably, the opened port(s) are at a lower position to allow for rapid exit of the treated seeds. In another embodiment, the drum may include at least two ports that are diametrically opposite one another: upper port(s) for receiving seeds and lower port(s) for discharging seeds.

Total Cycle Time

Traditional seed treatment apparatuses are generally incapable of applying large liquid loads described below. The seed treatment apparatus constructed according to the teachings set forth herein can (1) apply large volumes of liquid loads with simultaneous drying; and (2) apply drying powder to facilitate drying and improve seed functionality. The seed treatment apparatus also has a short cycle time and large batch size in order to make the method of using the seed treatment apparatus commercially and economically viable.

Typically, traditional seed treatment apparatuses can treat approximately 200 kg of seed in a treatment cycle time of approximately one minute, leading to an overall capacity of 12,000 kg seed per hour. When the liquid volume application is increased, the capacity is typically reduced to about 4,000 kg seed per hour to about 10,000 kg seed per hour, due to the longer cycle time required or a reduction in batch size. This overall capacity is dependent on the liquid volume applied. For a seed treatment apparatus to be commercially acceptable, it must provide seed throughput of at least about 4,000 kg seed per hour to 12,000 kg seed per hour. However, preferably, the overall capacity is higher to benefit from economy of scale.

As shown in Table 1, total cycle time impacts the throughput of the seed treatment apparatus. Therefore, the total cycle time of the seed treatment apparatus is preferably 10 minutes or less, more preferably 8 minutes or less. In this way, the seed treatment apparatus can maintain a commercially viable throughput while providing other benefits, such as self-cleaning, better coverage of seed treatment, and the prevention of wrinkling of the seed.

TABLE 1

Effect of Cycle Time on Batch Size for
Seed Treatment Apparatuses with
Integrated Drying

| Batch Size, Kg | Cycle Time, min | Throughput, Kg/hr |
|---|---|---|
| 1400 | 30 | 2800 |
| 1400 | 10 | 8400 |
| 1400 | 8 | 10500 |
| 1400 | 6 | 14000 | i. Short Cycle Time

In order to achieve a total cycle time of about 10 minutes or less, preferably 8 minutes or less, all steps of the seed treatment process (loading of 1,400 kg seed per batch, application of multiple liquid components, both active and inert, application of dry powder, drying and polishing, and unloading of treated seeds) should be completed in as short a cycle time as possible.

Automation of loading and unloading can reduce the total cycle time. Therefore, in some embodiments, the seed treatment apparatus can run in an automated semi-continuous mode. In this way, the coater can run sequential batches without requiring operator intervention and with automated loading and unloading steps.

The seed treatment apparatuses of the present disclosure have loading/unloading port(s) in the drum. Two rectangular ports of about 10 inches by 36 inches were made such that 1,400 kg seeds will flow in or out within less than two minutes and preferably within less than 90 seconds. The port size can be any desired shape or size. The port size can be increased or decreased to accommodate the desired amount of seed to be loaded and unloaded in the desired amount of time. To load the seed, the seed treater can be automatically positioned such that the loading/unloading port(s) are positioned at the top of the seed treatment apparatus and seeds fall into the seed treater from a hopper positioned above the seed treater. During the unloading cycle, the seed treater can be automatically positioned such that the loading/unloading port(s) are at the bottom and treated seed falls out of the seed treater into, for example, a collection bin or a transport conveyor.

In order to shorten the liquid delivery and application time and thereby reduce the total cycle time, pumps can be sized to deliver treatment liquid at a desired rate in the seed treatment apparatus of the present disclosure in order to achieve coating of the seeds with the liquid seed treatment in an acceptable amount of time. Ideal pump size depends on a variety of factors that will be readily apparent to the skilled person, including, but not limited to, batch size, type of liquid treatment, and amount of liquid treatment.

The seed treatment apparatus of the present disclosure also incorporates integrated drying, which can further help to reduce total cycle time, as seeds do not have to be transported from a seed treater to a dryer and undergo an additional drying step. Drying of seeds in the seed treatment apparatus is a complex function of many variables such as liquid load (volume, dependent on batch size), application rate, characteristics of the liquid, drying air flow rate, drying air temperature, relative humidity, and mixing conditions in the drum, among other factors.

Experiments were conducted at lab scale (1 to 1.75 kg seed per batch) and pilot scale (80 to 200 kg seed per batch) to determine the air requirements to dry corn, soy, and cotton seeds at upper limits of large liquid loads likely to be encountered in commercial treatment applications. Based on these experiments following conclusions were made and several design parameters for the dryer/blower for the coater were determined. For a given batch size and liquid load, the volume of air (cubic feet) is a function of air flow rate (cubic feet per minute, or CFM). Drying can become less efficient as the air flow rate is increased. In other words, even though a higher air flow rate gives a shorter drying cycle, drying can become less efficient if the air flow rate is increased. For example, drying cycle time is shortened if the air is heated from 22° C. (72° F.) to 45° C. (113° F.). For a given liquid load and air temperature, volume of air to dry one kilogram of seeds generally remains the same irrespective of the batch size. In other words, cubic feet of air per kg of seed can be used as a scale-up parameter to determine the blower size for a commercial size seed treatment apparatus.

ii. Drum Rotating Speed

Mixing conditions in a rotating drum can affect (1) dispersion of liquid and powder coating materials and (2) drying of objects. Therefore, similar mixing characteristics are preferably maintained when scaling up from lab-size equipment to large commercial equipment. This ensures that the coating quality and drying cycle achieved in lab treater will be similar when done in a large commercial treater. A scale-up parameter that is often used is Critical Rotation Speed. At critical speed (measured in RPM), mixing related attributes and characteristics of the process scale up properly from lab to large scale. Critical speed is defined as:

$$\text{Critical Speed(RPM)} = 76.3/\text{Sqrt(diameter in feet)}$$

Lab scale runs were done between 35 to 45% of the critical speed of the lab treater. Therefore, it is desirable that the large scale coater be capable of rotating at RPM that is in the range of 35-45% of its critical speed. Variable speed motor and its control can therefore be designed to meet this objective.

Application of Liquid Seed Treatment

Generally, the amount of liquid seed treatment that is applied to the seed can vary depending on the seed weight to be coated, surface area of the seed, the concentration of the agrochemical(s) and/or other active ingredients in the liquid seed treatment, the desired concentration on the finished seed, the plant species, and the environment in which the seed is intended to be sown, among other factors.

Although the amount of liquid seed treatment may vary based on the factors above, in some embodiments, at least about 50 fluid ounces (1479 mL) of liquid seed treatment is applied per 100 pounds (45 kg) of seed. For example, at least about 55 fluid ounces (1627 mL), at least about 60 fluid ounces (1774 mL), at least about 75 fluid ounces (2218 mL), or at least about 100 fluid ounces (2957 mL) of liquid seed treatment may be applied per 100 pounds (45 kg) of seed. As an example, where the seed is cotton seed, at least about 45 fluid ounces (1331 mL), at least about 60 fluid ounces (1774 mL), at least about 100 fluid ounces (2957 mL), at least about 150 fluid ounces (4436 mL), or at least about 200 fluid ounces (5914 mL) of liquid seed treatment can be applied per 100 pounds (45 kg) of cotton seed. As an example, where the seed is corn seed, at least about 30 fluid ounces (887 mL), at least about 40 fluid ounces (1183 mL), at least about 50 fluid ounces (1627 mL), at least about 60 fluid ounces (1774 mL), or at least about 65 fluid ounces (1922 mL) of liquid seed treatment may be applied per 100 pounds (45 kg) of corn seed. As an example, where the seed is soybean seed, at least about 8 fluid ounces (237 mL), at least about 10 fluid ounces (296 mL), at least about 12 fluid ounces (355 mL), at least about 15 fluid ounces (444 mL), or at least about 18 fluid ounces (532 mL) of liquid seed treatment may be applied per 100 pounds (45 kg) of soybean seed.

Liquid typically needs to be applied quickly to reduce the total cycle time. The liquid seed treatment can be applied to the seed by a variety of means, for example by a spray nozzle or revolving disc. Preferably, liquid seed treatment is applied to the seeds by a spray nozzle. Fine spray is not generally required, as most of the coating can occur by seed-to-seed contact during the tumbling of wet seeds in the drum. However, liquid seed treatments can sometimes be in the form of slurries containing large amounts of solids which can easily clog the fine spray nozzles, causing frequent interruptions in the cycle. Such clogging could undesirably increase the cycle time. To remedy this issue, nozzles suitable for slurries with suspended solids should be used in place of fine spray nozzles, especially in embodiments where slurries are used. For example, nozzles supplied by SPRAYING SYSTEMS CO with equivalent orifice diameter of about 0.12 to 0.14 inches (about 3 to 3.5 mm) are suitable for application of seed treatment slurries.

Pump speed for liquid seed treatment application may be varied, for example, from about 5 rpm to about 50 rpm. Pan speed, atomization, and spray pattern may also be varied based on the type of seed treater, the type and quantity of seed treatment and the type of seeds to be treated. For example, the pan speed may be adjusted so that the seeds roll gently in the pan as opposed to centrifugal action or other aggressive action that may damage the seeds. This can be achieved by adjusting the RPM to about 35 to 45% of critical speed. Spray may be adjusted for a fan spray pattern between about 2 to about 8 inches (about 5 to about 20 cm) wide at the point where the spray hits the tumbling seed bed. Spray pressure may depend upon nozzle size, liquid viscosity, and flow rates, among other factors.

In some embodiments, upon application of the liquid seed treatment to the seeds, at least about 95% of the seeds will be fully coated with the liquid seed treatment. For example, at least about 85%, at least about 90%, at least about 95%, or at least about 99% of the seeds will be fully coated with the liquid seed treatment. Preferably, at least about 95% of the seeds will be fully coated with the liquid seed treatment. In some embodiments, at least about 99% of the area of the seed surface will be coated with the liquid seed treatment. For example, at least about 85%, at least about 90%, at least about 95%, or at least about 99% of the area of the seed surface will be coated with the liquid seed treatment.

In some instances, as the seed falls into the treatment apparatus, the seed is treated (for example, by misting or spraying with the liquid seed treatment) and passed through the treater under continual movement, tumbling, and/or agitation. In some embodiments, the seed is added to the seed treater and the air flow is turned on and allowed to reach the appropriate speed and temperature prior to liquid seed treatment application.

The duration of the application of the liquid seed treatment may vary depending on the amount of seed treatment to be applied, the amount of seeds to be treated, the pump speed, and other factors. For example, the duration of the application of the liquid seed treatment may be less than about 8 minutes, less than about 7 minutes, less than about 5 minutes, less than about 2 minutes, less than about 1 minute, less than about 30 seconds, or less than about 20 seconds. Preferably, the seed liquid seed treatment is applied for a duration of from about 20 seconds to about 1 minute or from about 10 seconds to about 40 seconds. Where more liquid seed treatment is added, the application time may be increased. Preferably, the liquid application time is less than about 5 minutes, more preferably, less than about two minutes, to ensure that the total cycle time does not exceed desired limits. After application of the liquid seed treatment, the wetted seeds may be conditioned for a period of time in the seed treatment apparatus to allow for adequate drying of the wetted seeds. For example, the wetted seeds are typically conditioned for a period of from about 5 seconds to about 2 minutes, from about 10 seconds to 1 minute, from about 10 seconds to about 40 seconds, or from about 15 seconds to about 30 seconds.

In some embodiments, after a conditioning period has elapsed to allow for drying of the liquid seed treatment, a second liquid seed treatment may be applied. The second liquid seed treatment may be the same or different as the first liquid seed treatment. Allowing for adequate drying of the first liquid seed treatment before application of the second liquid seed treatment will allow for the formation of layers of liquid seed treatment. Layers of seed treatment may, for example, help time elapse release of agrochemicals and biological agents at appropriate points in the germination of the seed and subsequent growth of the plant. Layers of seed treatment may also help to shield toxicity of a certain type of seed treatment from humans and/or the seed itself. For example, if a particular type of seed treatment is toxic to humans, another non-toxic seed treatment may be layered on top to allow for easier handling of the treated seed, along with other benefits. Further, layering of seed treatment may allow for increased resistance to pests.

When coating seed on a large scale (for example, a commercial scale), the liquid seed treatment may be applied using a batch process. For example, a known weight of seeds can be introduced into the treatment equipment (such as a tumbler, a mixer, or a pan granulator). A known volume of the additional seed treatment can be introduced into the treatment equipment at a rate that allows the liquid seed treatment to be applied evenly over the seeds. During the application, the seeds can be mixed, for example by spinning or tumbling.

When the liquid seed treatment is applied to the seeds using a batch process, the seed treatment apparatus may be, for example, a batch treater. For example, in some instances, the additional seed treatment is applied using a batch process and the seed treatment apparatus comprises a rotating bowl seed treater. In other instances, the liquid seed treatment is applied using a batch process and the seed treatment apparatus comprises a rotating drum treater.

Application of Dry Seed Treatment

In some embodiments, the seed treatment apparatus is also capable of applying a dry seed treatment following application of the liquid seed treatment. In these embodiments, the wetted seed is contacted with the dry seed treatment within the same seed treatment apparatus used to apply the liquid seed treatment to the seed.

The amount of dry seed treatment applied to the seed depends upon the process parameters, crop type, and content of the liquid seed treatment, among other factors.

Application of the dry seed treatment may occur automatically or manually, for example, through an auger feeder, vibratory pipe feeder, or liquid spray bars with nozzles appropriate for dry seed treatment application. In preferred embodiments, application of the dry seed treatment occurs automatically inside the seed treatment apparatus.

After application of the liquid seed treatment, the wetted seeds may be conditioned for a period of time in the seed treatment apparatus to allow for adequate drying of the wetted seeds before application of the dry seed treatment. For example, the wetted seeds are typically conditioned for a period of from about 5 seconds to about 2 minutes, from about 10 seconds to 1 minute, from about 10 seconds to about 40 seconds, or from about 15 seconds to about 30 seconds before being contacted with the dry seed treatment. In some embodiments, the dry seed treatment may be applied prior to or simultaneously with the application of the liquid seed treatment. In other embodiments, the dry seed treatment is applied after application of the liquid seed treatment.

The dry seed treatment should be added when the wetted seeds have a proper degree of surface wetness to promote good adhesion of powder to the surface. If the seeds are too wet when the dry seed treatment is applied, the treated seeds will exhibit reduced shine, pearlescence, and/or reflectivity. On the other hand, if the seeds are allowed to become too dry before addition of the dry seed treatment, the dry seed treatment may not adhere properly to the surface of the seed, and the treated seeds may exhibit undesirable dust generation and might become too shiny.

The surface wetness of the wetted seeds can be routinely evaluated by those skilled in the art. For example, the surface wetness of the wetted seeds can be tested using a glove test, wherein a sample of wetted seeds taken from the treatment apparatus just before the dry powder application step is held in a light-colored latex glove. If the glove becomes significantly colored with residue from the wetted seeds, the process should be adjusted to provide the wetted seeds with more spin time (in the case of a rotating bowl seed treater) or residence time (in the case of a horizontal drum seed treater) before they are contacted with the dry seed treatment.

Generally, there is a significant range of surface wetness where the dry seed treatment application works satisfactorily, and an appropriate application point for the dry seed treatment can be determined by one skilled in the art using routine experimentation.

In some instances, the seed may be contacted with the dry seed treatment for a duration of less than about 2 minutes, less than about 1 minute, less than about 45 seconds, less than about 30 seconds, or less than about 20 seconds. In some instances, after the dry seed treatment has been added to the seed treatment apparatus, the treated seeds are allowed to spin and/or tumble for a period of from about 5 seconds to about 60 seconds to ensure that the powder is uniformly distributed across the surface of the seeds.

In preferred embodiments, the total cycle time, measured from the start of liquid seed treatment application to the end of the final tumbling period (after conditioning period where no dry seed treatment is applied, or after tumbling where a dry seed treatment is applied), is less than about 8 minutes. For example, the total cycle time can be from about 30 seconds to about 8 minutes, from about 30 seconds to about 5 minutes, from about 30 seconds to about 3 minutes, from about 30 seconds to about 2 minutes, or from about 30 seconds to about 1 minute.

The seed throughput of the seed treatment apparatus is typically greater than about 175 kg of seed per minute, measured from the start of the liquid seed treatment application to the end of the final tumbling period (after conditioning period where no dry seed treatment is applied, or after tumbling where a dry seed treatment is applied). When the seed is cotton seed, the seeds can have a seed throughput in the seed treatment apparatus of greater than about 175 kg of seed per minute when at least about 100 fluid ounces (2957 mL) liquid seed treatment is applied per 100 pounds (45 kg) of seed. When the seed is soybean seed, the seeds can have a seed throughput in the seed treatment apparatus of greater than about 200 kg of seed per minute when at least about 14 fluid ounces (414 mL) liquid seed treatment is applied per 100 pounds (45 kg) of seed. When the seed is corn seed, the seeds can have a seed throughput in the seed treatment apparatus of greater than about 200 kg of seed per minute when at least 45 fluid ounces (1331 mL) liquid seed treatment is applied per 100 pounds (45 kg) of seed. As an example, the seed throughput can be from about 175 kg seed per minute to about 233 kg seed per minute, from about 175 kg seed per minute to about 350 kg seed per minute, or from about 233 kg seed per minute to about 175 kg seed per minute.

For example, in a batch process wherein the seed treatment apparatus is a rotating bowl treater, the dry seed treatment can be introduced into the rotating bowl. In some embodiments, this occurs after the liquid seed treatment application has been completed.

Often, it is desirable that the wetted seeds be dried or conditioned to ensure that they have an appropriate degree of surface wetness before application of the dry seed treatment. This can be achieved, for example, by allowing the seeds to dwell in the rotating bowl for a conditioning period following application of the liquid treatment composition. For example, the dry seed treatment may be added to the rotating bowl after a conditioning period of from about 2 seconds to about 2 minutes, from about 2 seconds to about 1 minute, from about 5 seconds to about 30 seconds, or from about 5 seconds to about 20 seconds following the period in which the liquid seed treatment composition is added to the rotating bowl. The conditioning period may be dependent on the type and amount of liquid seed treatment and the type and amount of airflow.

Clean-in Place (CIP) System

The seed treatment apparatus 10 may also be cleaned in place, without the need for manually cleaning and scraping of seed treatment buildup in the interior. The seed treatment apparatus 10 may be cleaned through the spraying of a solvent on the interior of the apparatus. In preferred embodiments, the solvent used to clean the interior of the seed treatment apparatus 10 is water.

In row crops manufacturing plants, organic solvents are not typically used and the residues that need to be removed may not be water-soluble. For a CIP system to work for seed treatment applications, the seed treatment apparatus can resemble certain features of a pressure washer. Different types of higher pressure nozzles (for example, those supplied by GAMAJET CLEANING SYSTEMS, E-27 spray ball with a 6 gpm (22.7 L per minute) pump at 700PSI) can be used in the seed treatment apparatus of the present disclosure, in order to develop a more effective CIP system. For example, the water can be under a pressure of from about 100 PSI (689 kPa) to about 1,000 PSI (6,895 kPa), from about 200 PSI (1,379 kPa) to about 1,000 PSI (6,895 kPa), from about 300 PSI (2,068 kPa) to about 1,000 PSI (6,895 kPa), from about 400 PSI (2,758 kPa) to about 1,000 PSI (6,895 kPa), from about 500 PSI (3,447 kPa) to about 1,000 PSI (6,895 kPa), from about 500 PSI (3,447 kPa) to about 900 PSI (6,205 kPa), from about 500 PSI (3,447 kPa) to about 800 PSI (5,516 kPa), from about 600 PSI (4,137 kPa) to about 800 PSI (5,516 kPa), from about 600 PSI (4,137 kPa) to about 700 PSI (4,826 kPa), or from about 700 PSI (4,826 kPa) to about 800 PSI (5,516 kPa). Furthermore, heated water can sometimes be much more effective than ambient water in cleaning the drum. For example, the water can be heated to at least about 50° C., at least about 60° C., to at least about 70° C., at least about 80° C., or at least about 90° C. As an example, the water can be from about 40° C. to about 80° C., from about 40° C. to about 70° C., from about 50° C. to about 70° C., from about 60° C. to about 70° C., or from about 50° C. to about 60° C. Therefore, a heating system can be added to the CIP system to effectively clean the drum with high pressure water. The pressure profile and the temperature of the solvent, generally water, used to clean the interior of the seed treater may vary depending on the amount and type of buildup. In some embodiments, at least about 40%, at least about 50%, at least about 60%, at least about 70%, at least about 80%, at least about 90%, at least about 92%, at least about 95%, at least about 97%, or at least about 99% of the buildup is removed.

Having described embodiments of the invention in detail, it will be apparent that modifications and variations are possible without departing from the scope of the invention defined in the appended claims.

EXAMPLES

The following non-limiting examples are provided to further illustrate embodiments of the present invention.

Example 1: Process Description

In the Examples below, slurry components were shaken on a model 6010 EBERBACH SHAKER until all solids were suspended, and then measured out with BD syringes according to the slurry recipe. Components were put into a centrifuge tube and mixed on a Model G560 VORTEX-GENIE 2 at speed 10 until the slurry was homogenous. If over 50 mL of slurry was required, components were put in a glass jar and placed back on the shaker until mixed. Water was replaced with the addition of AQUAKLEAN 418 to maintain the same slurry volume as before.

Seeds were treated in a Model 11 WINTERSTEIGER HEGE ("HEGE") liquid seed treater. After the treater reached full speed (1600 rpm), slurry was added through syringes at the rate specific to the seed treatment, as indicated in the Examples below.

Seeds were also treated in a Model LDCS FREUND-VECTOR HI-COATER SYSTEM ("VECTOR"). This seed treater consists of a perforated rotating drum. Liquid treatment is applied using a nozzle and pump system. This seed treater has an integrated drying system where ambient or heated air is introducing during treatment to achieve simultaneous drying. Where dry seed treatment was used, it was manually applied through a port in the front door of the machine. Slurry was measured out with a BD syringe and placed in a coming graduated cylinder appropriate to the amount of slurry being used. Seed as added to the pan and the treater was allowed to reach the desired blower speed and temperature specific to the seed treatment. The pan was turned on and the slurry was applied until all of the slurry from the graduated cylinder was applied to the seed. All times given in the Examples below are relative to the starting point of slurry application. A pan speed of 35 rpm (47% of Critical Speed), atomization of 15.4 psi (106 kPa), and spray pattern at 12.0 psi (82.7 kPa) was maintained on the VECTOR treater for all Examples, except where indicated otherwise.

Example 2: Cotton Seed Treatment

Liquid seed treatment (50 fl. oz.; 1479 mL) in the form of a slurry was prepared. The slurry was applied in both seed treaters at a rate of about 50 fl oz/cwt (1479 mL/cwt).

Cotton seed (700 g) was added to the HEGE treater. The slurry (22.71 mL) was applied for a duration of 20 seconds. The seeds were conditioned until a total time of 4 minutes. 0.3% SunMica (2.1 g) was added and the seeds were spun until a total time of 4 minutes 30 seconds. The total cycle time was 4 minutes 30 seconds.

The VECTOR seed treater had parameters set at 50 rpm pump speed, 100 cfm air speed (2.83 m³/min), and no heat. Slurry (22.71 mL) was applied to cotton seed (700 g) for 39 seconds. The seeds were tumbled until a total time of 1 minute 10 seconds. 0.3% SunMica (2.1 g) was added to the seeds and tumbled until a total time of 2 minutes 10 seconds. The total cycle time was 2 minutes 10 seconds.

Figure 3:
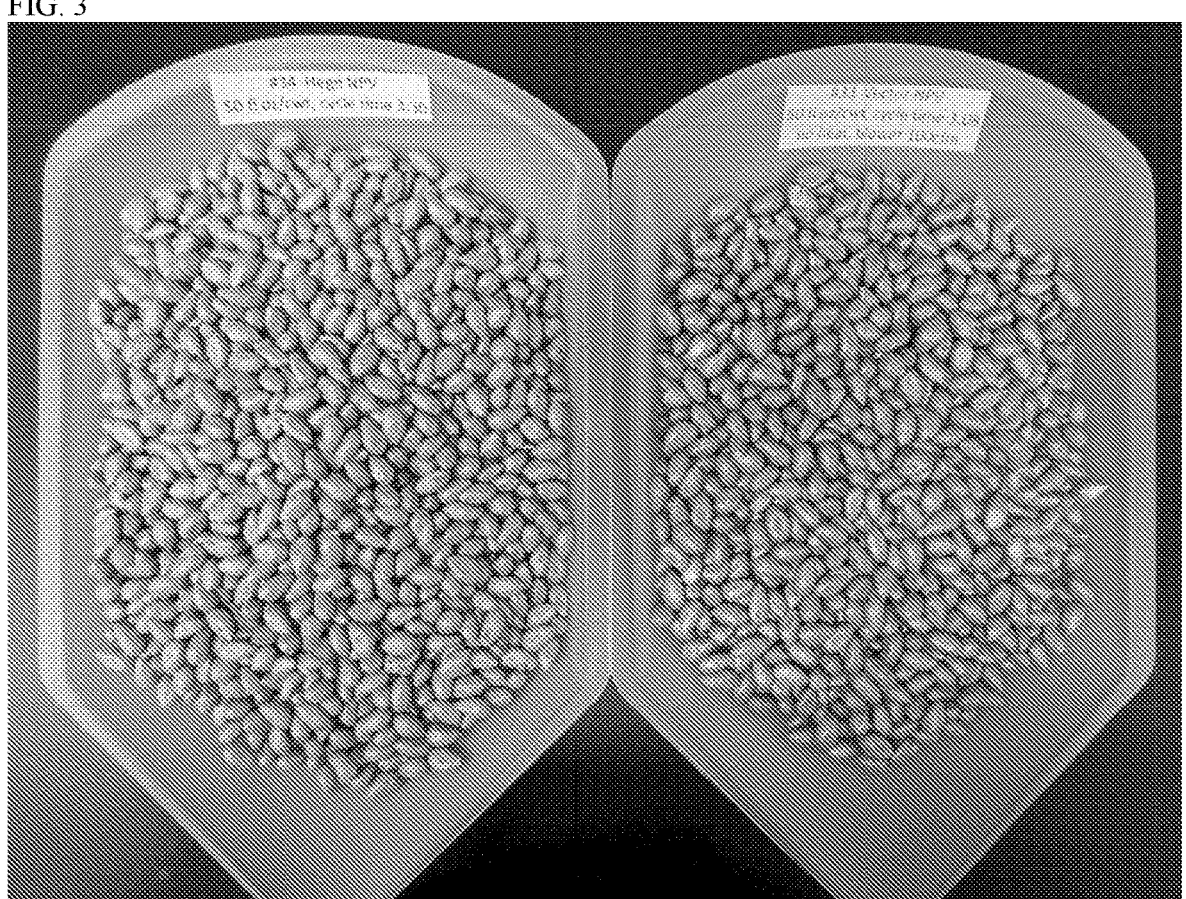
FIG. 3 is a side-by-side photograph of cotton seeds treated using a conventional method and cotton seeds treated using the method described in Example 2.
Figure 4:
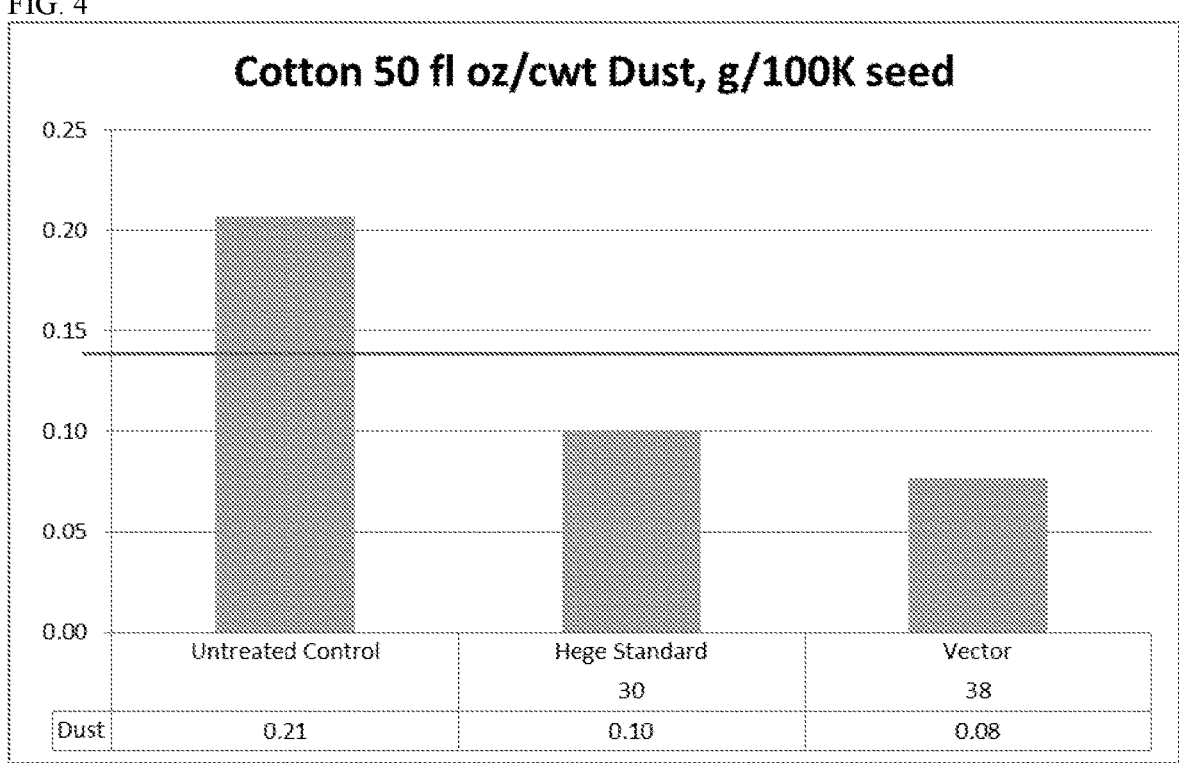
FIG. 4 is a graph of the dust off (grams per 100,000 seeds) of cotton seeds treated using the method described in Example 2.
Figure 5:
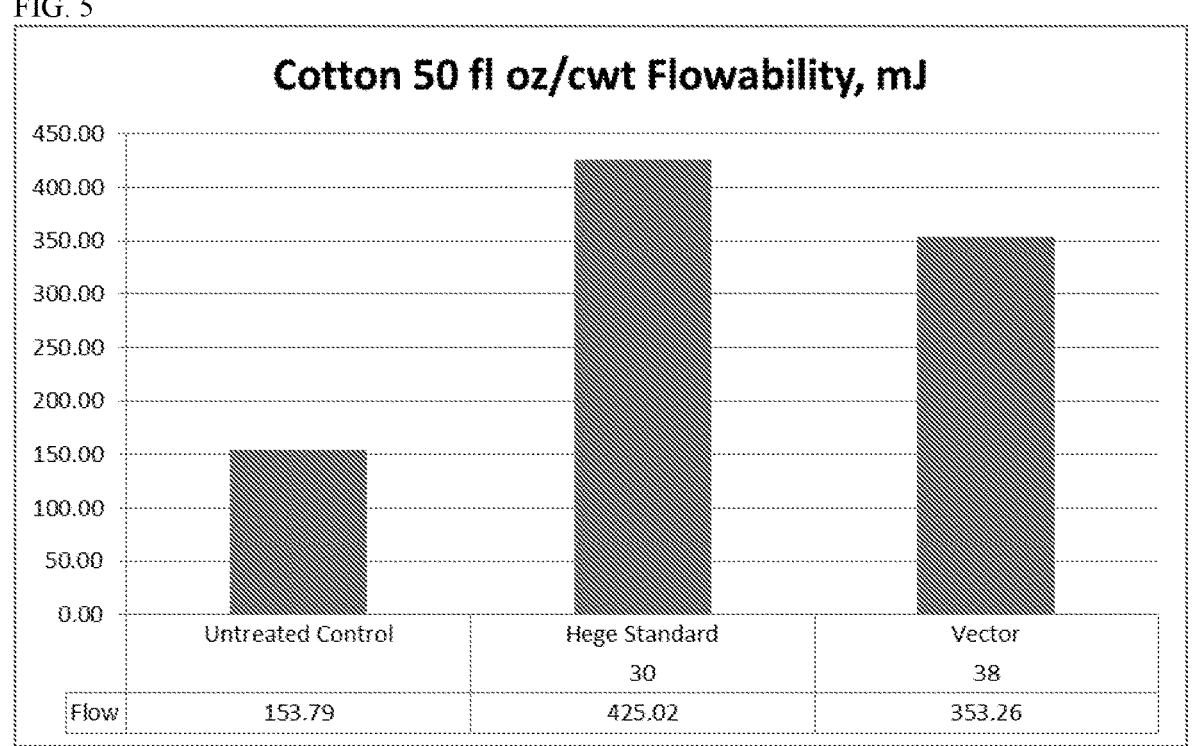
FIG. 5 is a graph of the flowability (mJ) of cotton seeds treated using the method described in Example 2.

Results presented in FIGS. 3-5 demonstrate that the seed treated in the VECTOR seed treater with simultaneous drying are equivalent to or better than those treater in the standard HEGE treater in appearance, dust, and flowability.

Example 3: High-Rate Cotton Seed Treatment

The standard HEGE treater struggles to produce dry seeds at 50 fl oz/cwt rate. Therefore, it is inconceivable that 70 fl oz (2.07 L) or more could be applied using the HEGE system. To demonstrate the capability of a treater with an integrated drying system, e.g., the VECTOR treater, as much as four times (200 fl oz; 5.91 L) liquid seed treatment was applied and still produced completely dry seeds with excellent coverage and appearance while maintaining a short cycle time.

The VECTOR seed treater had parameters set at 18 rpm pump speed, 100 cfm (2.83 m³/min) air speed, and 45° C. heated air. Slurry (91.36 mL) was applied to delinted cotton seed (700 g) for 7 minutes 4 seconds. Before all the slurry was applied, at 6 minutes 31 seconds total cycle time, 0.2% SunMica (1.4 g) was applied. The seeds were tumbled until a total time of 7 minutes 31 seconds. The total cycle time was 7 minutes 31 seconds.

Figure 6:
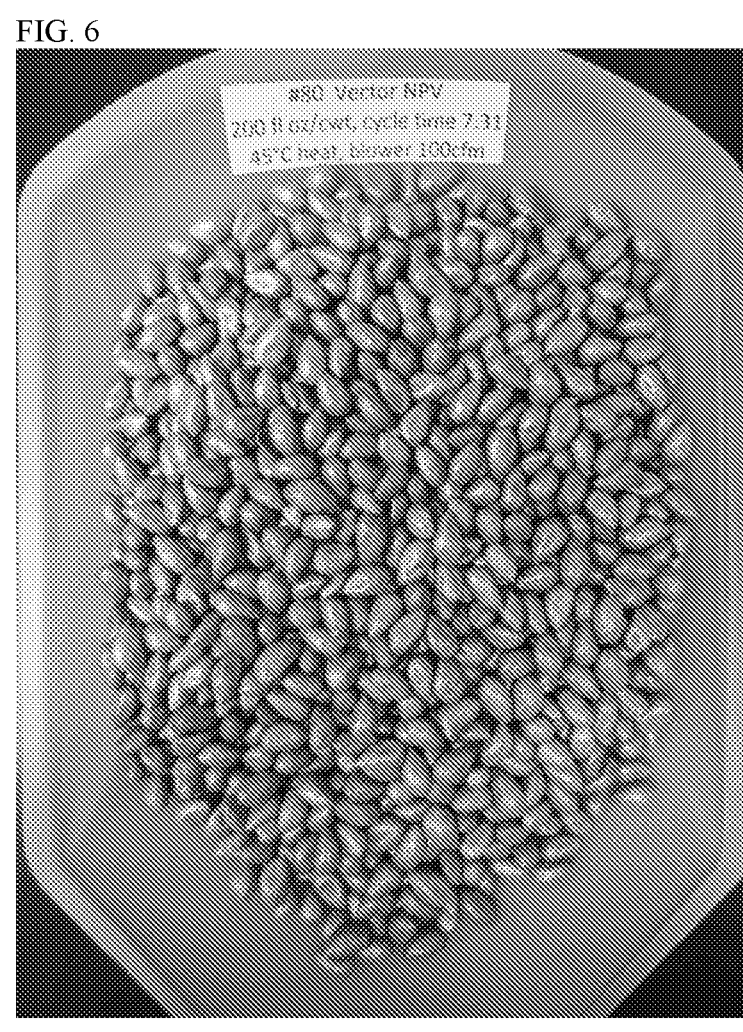
FIG. 6 is a photograph of cotton seeds treated using a conventional method and cotton seeds treated using the method described in Example 3.

Results presented in FIG. 6 indicate that the seeds treated in the VECTOR seed treater with a high liquid load and simultaneous drying have good appearance and coverage of seed treatment.

Example 4: Corn Seed Treatment

Corn seeds were used having an application rate of about 25 fl oz/cwt. Application rates varied among the seed treaters, as the desired high-rate application was inconceivable in the HEGE treater.

In the HEGE treater, a slurry (11.30 mL) was added to corn seed (700 g) at an application rate of about 25 fl oz/cwt (739 mL/cwt) for 8 seconds. The seeds were spun until a total time of 40 seconds. The total cycle time was 40 seconds.

The VECTOR treater had parameters set at 50 rpm pump speed, 100 cfm air speed, and no heat. Slurry (11.30 mL) mixed with colored water (20 mL) was applied to corn seed (700 g) at an application rate of 68 fl oz/cwt (2011 mL/cwt) for 50 seconds. The seeds were spun until a total time of 1 minute 40 seconds. The total cycle time was 1 minute 40 seconds.

Figure 7:
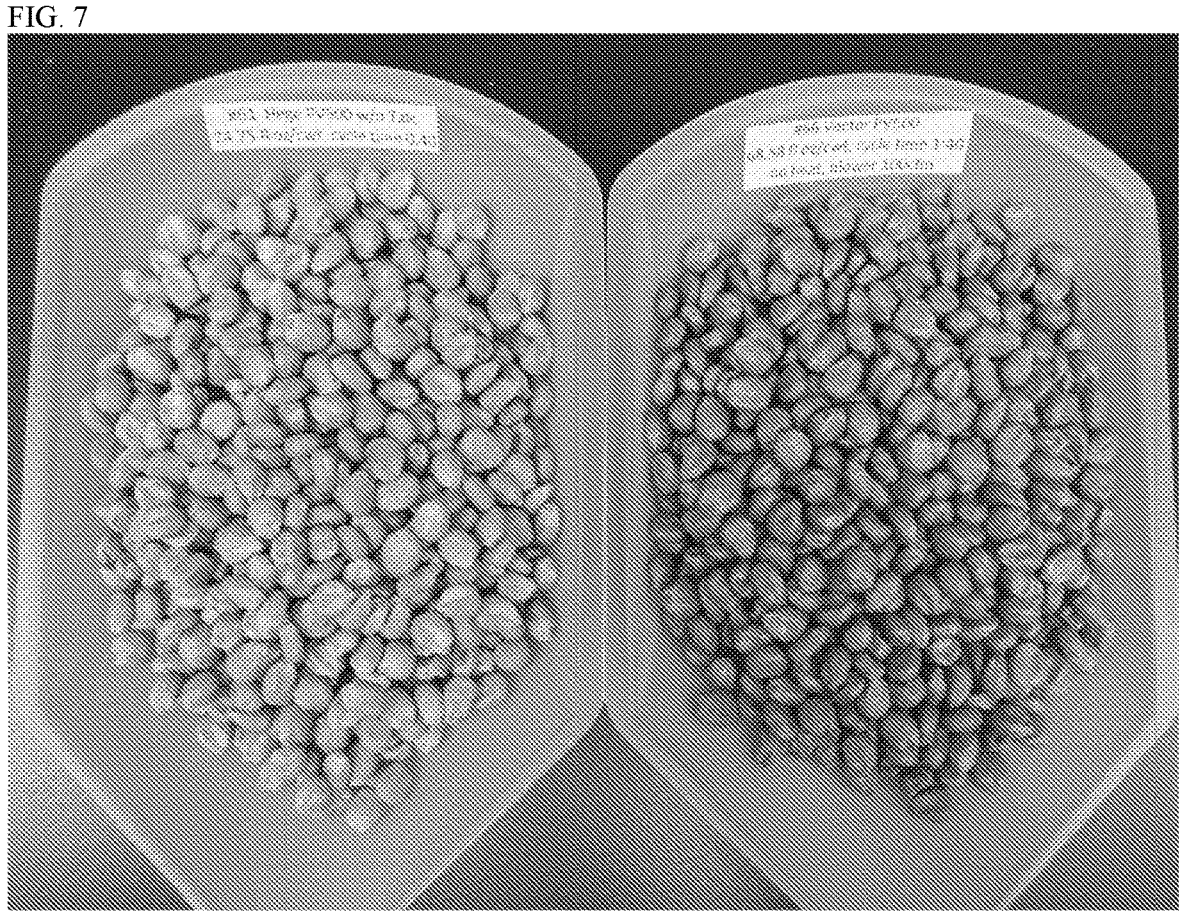
FIG. 7 is a side-by-side photograph of corn seeds treated using a conventional method and corn seeds treated using the method described in Example 4.
Figure 8:
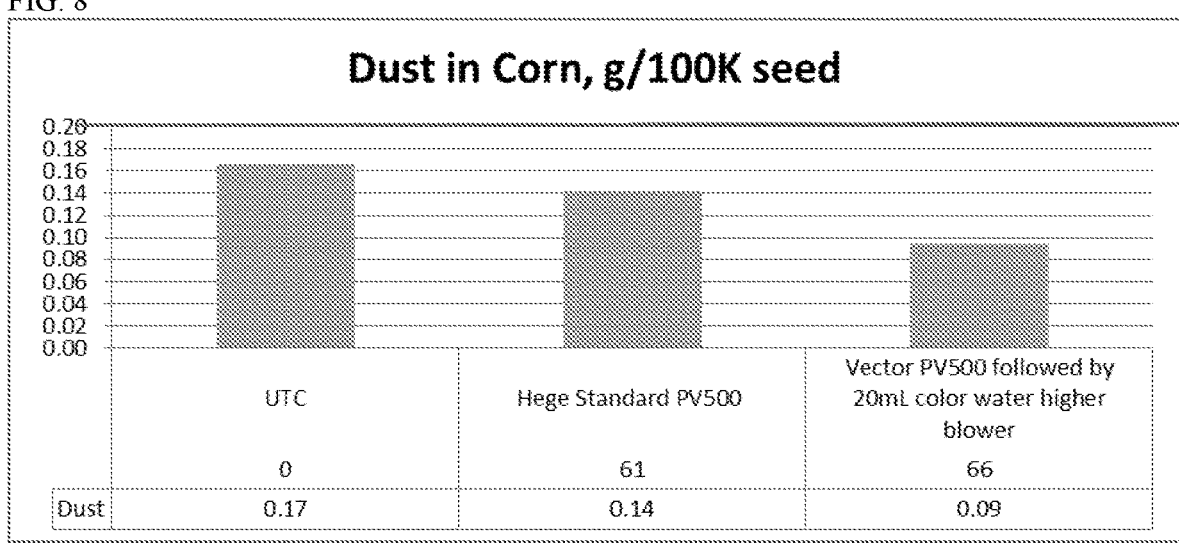
FIG. 8 is a graph of the dust off (grams per 100,000 seeds) of corn seeds treated using the method described in Example 4.
Figure 9:
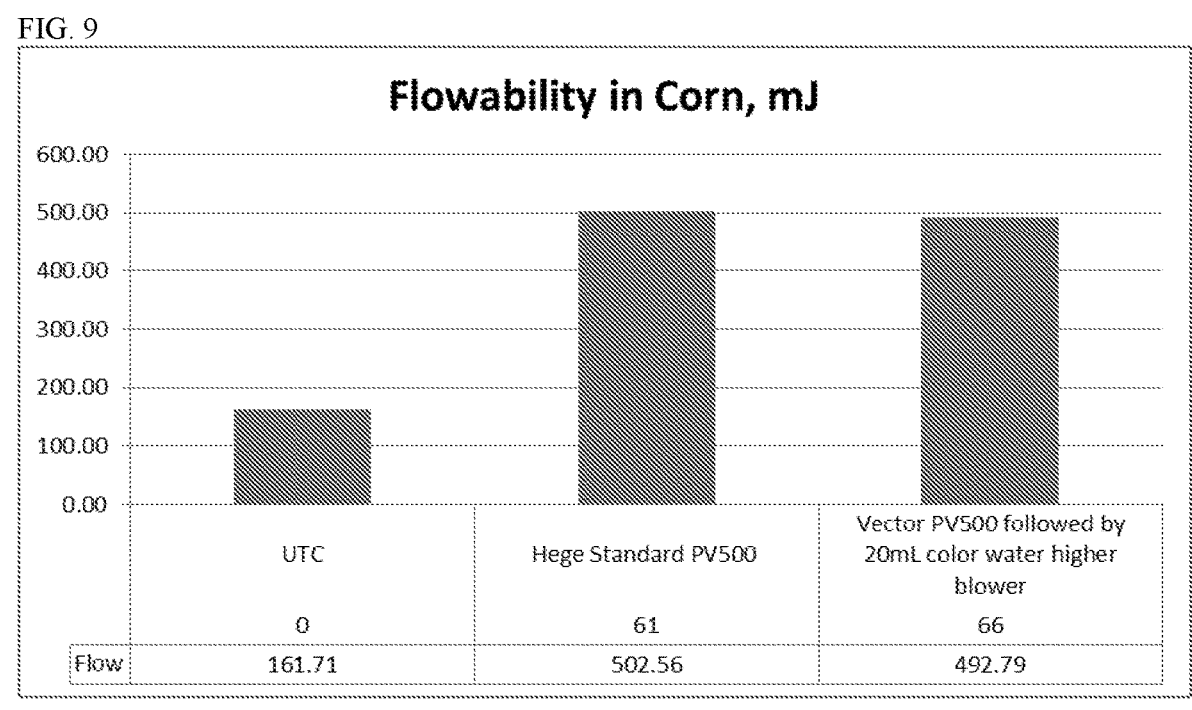
FIG. 9 is a graph of the flowability (mJ) of corn seeds treated using the method described in Example 4.

Results are shown in FIGS. 7-9. Even at a high application rate, the VECTOR treater with integrated drying produced completely dry seeds with excellent coverage, low dust, and very good flowability. As can be seen in FIG. 7, the VECTOR treater also filled the dents of the corn seed left uncovered by the HEGE treater.

Example 5: Soybean Seed Treatment

Soybean seeds were used having an application rate of about 8 fl oz/cwt. Application rates varied among the seed treaters, as the desired high-rate application was inconceivable in the HEGE treater.

In the HEGE treater, slurry (2.75 mL) was applied to soybean seed (700 g) at an application rate of 6 fl oz/cwt (177 mL/cwt) for 8 seconds. The seeds were spun until a total time of 15 seconds. 0.1% SunMica (0.7 g) was then added and the seeds were spun until a total time of 30 seconds. The total cycle time was 30 seconds.

The VECTOR treater had parameters set at 45 rpm pump speed, 100 cfm air speed, and no heat. Slurry (15 mL) was applied to soybean seed (1275 g) at an application rate of 18 fl oz/cwt (532 mL/cwt) for 25 seconds. The seeds were allowed to tumble until a total time of 45 seconds. Then, 0.1% SunMica was added and the seeds were tumbled until a total time of 1 minute 30 seconds. The total cycle time was 1 minute 30 seconds.

Figure 10:
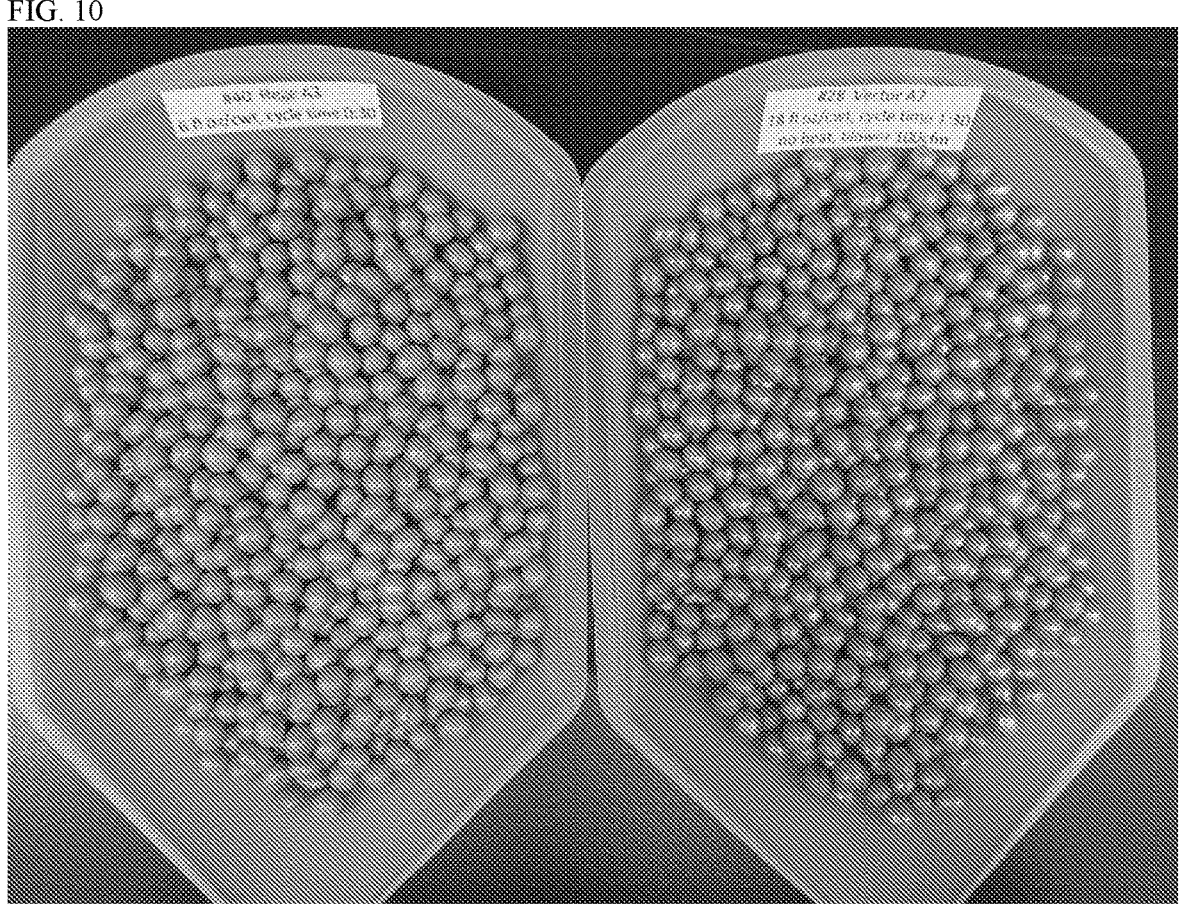
FIG. 10 is a side-by-side photograph of soybean seeds treated using a conventional method and soybean seeds treated using the method described in Example 5.
Figure 11:
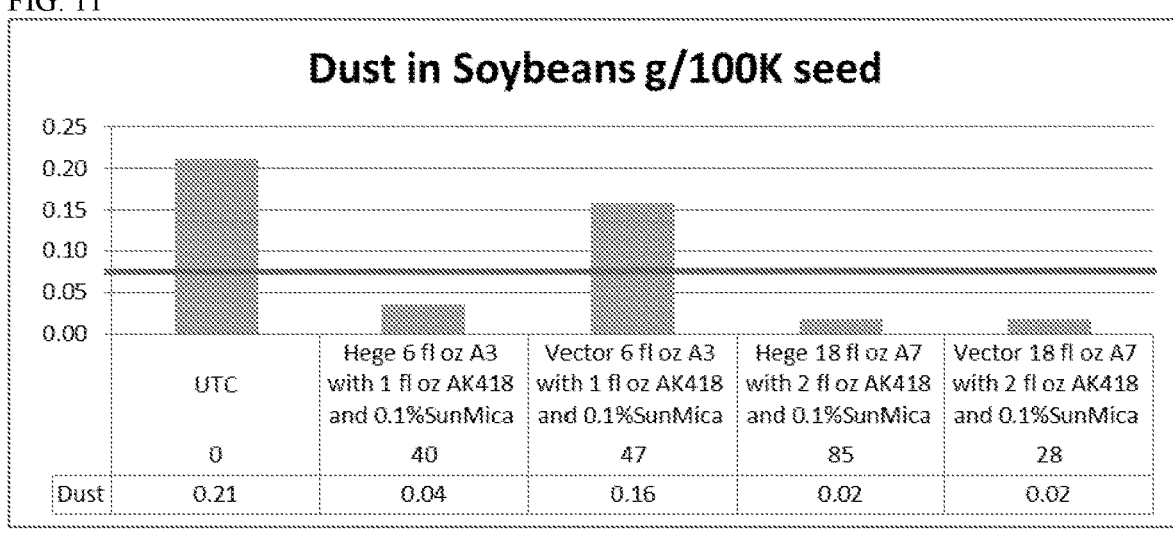
FIG. 11 is a graph of the dust off (grams per 100,000 seeds) of soybean seeds treated using the method described in Example 5.
Figure 12:
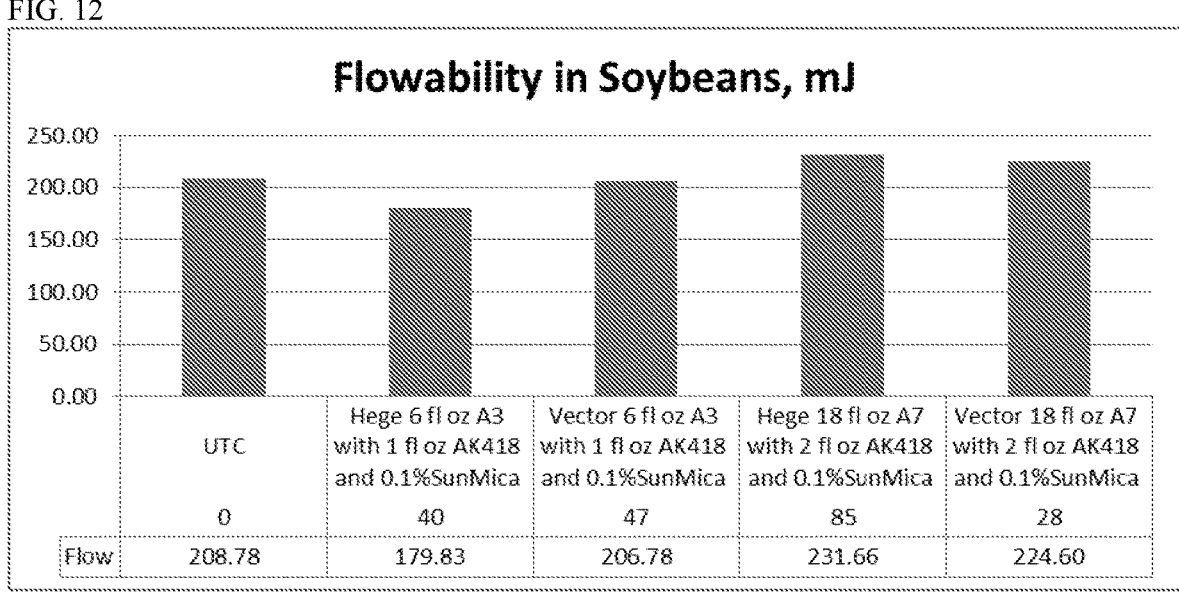
FIG. 12 is a graph of the flowability (mJ) of soybean seeds treated using the method described in Example 5.

Results are demonstrated in FIGS. 10-12. Even at a high application rate, the VECTOR treater with integrated drying produced completely dry seeds with excellent coverage, low dust, and very good flowability. As can be seen in FIG. 10, the soybean seeds did not exhibit any wrinkling even at very high liquid loading rates.

Example 6: Area of Seed Treatment Coverage

Optical imaging techniques were conducted to determine the percent of seeds covered (FIG. 13) and the percent area of the seed surface covered (FIG. 14) on seeds treated according to the described methods, comparing seeds treated with HEGE treater and those with the VECTOR treater. Optical imaging was analyzed using an image analysis program such a ImageJ which is a public domain, Java-based image processing program developed at the National Institutes of Health.

Figure 13:
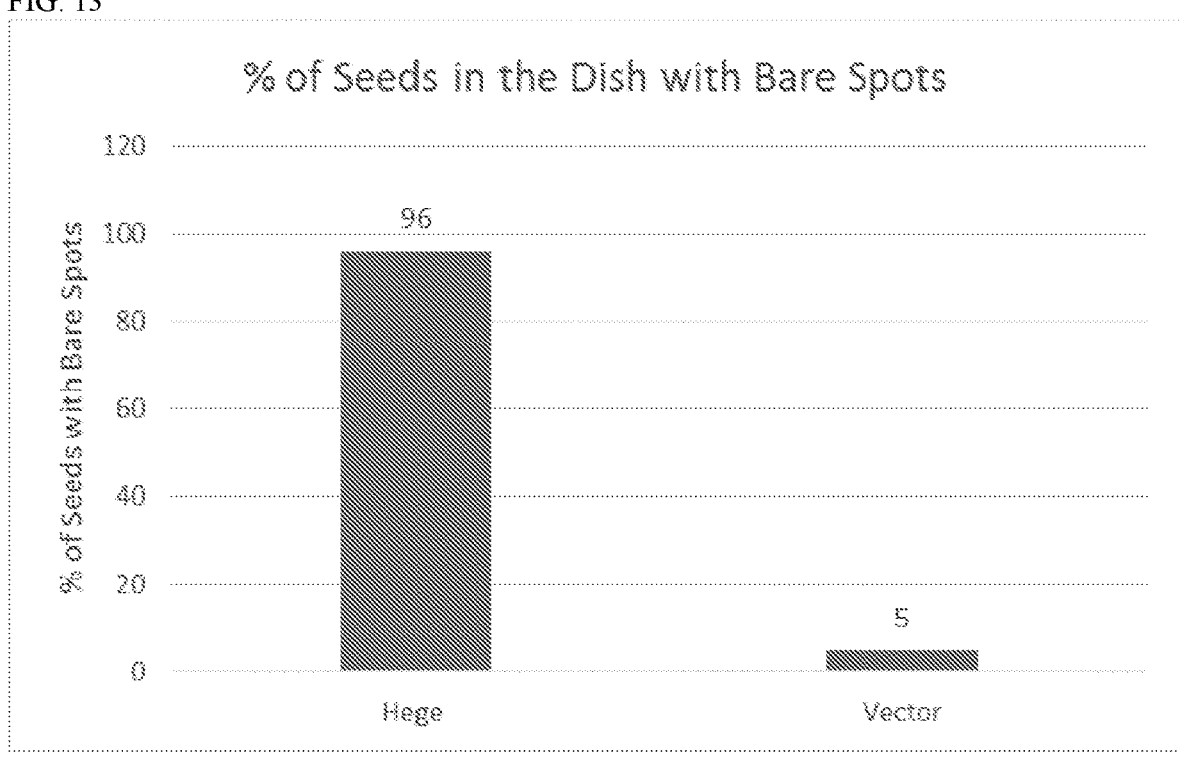
FIG. 13 is a graph of the percent of seeds with bare spots, comparing traditional seed treaters with seed treaters with integrated drying.
Figure 14:
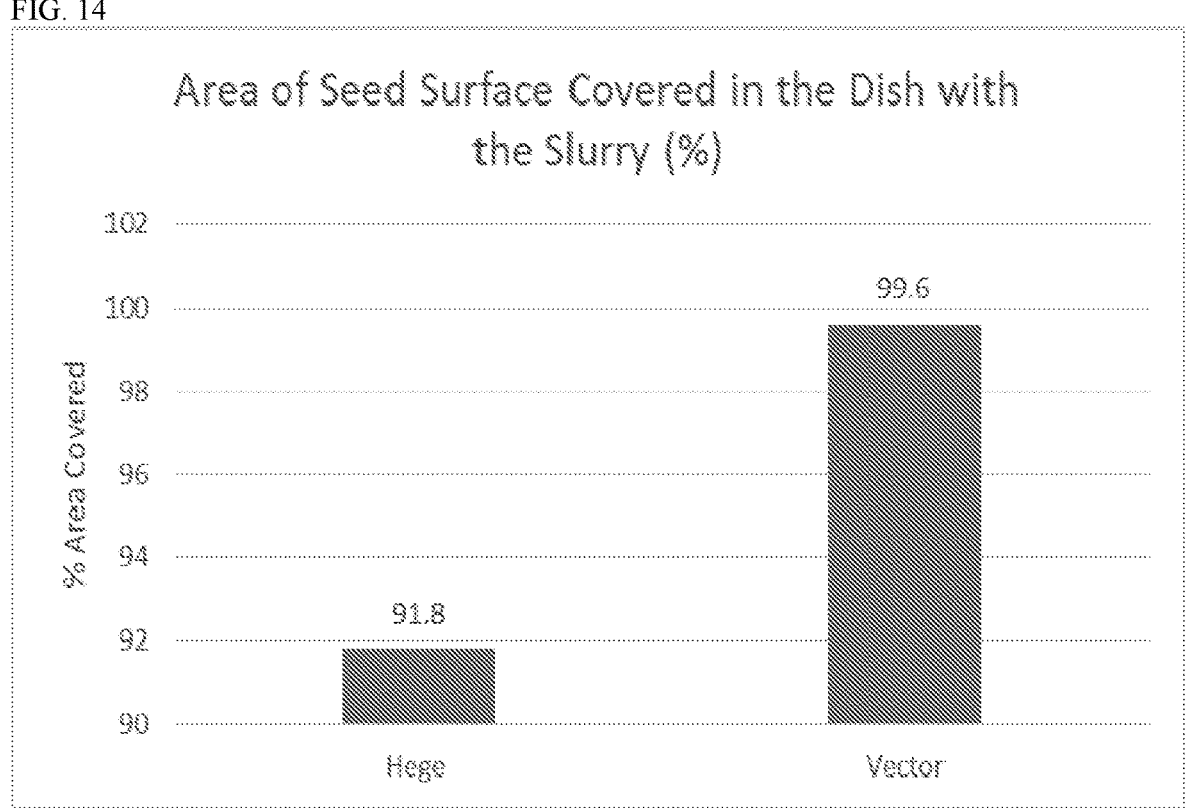
FIG. 14 is a graph of the percent area of the seed surface covered with slurry, comparing traditional seed treaters with seed treaters with integrated drying.

As can be seen from FIG. 13, the VECTOR treater had 91% less seeds with bare spots than the HEGE treater. Further, FIG. 14 shows that the VECTOR treater supplied almost 100% coverage of the seeds with the seed treatment.

Example 7: Loading and Unloading Time from the Modified Coater

In order to determine the loading and unloading time from the coater which had been modified to load and unload from two rectangular openings in the coater, a loading and unloading test was conducted with about 800 kg of delinted cotton seeds. First, the coater was rotated such that the openings were at the top. A hopper above one of the treater opening was filled with about 800 kg of seeds and the time to empty the hopper into the coater via one opening was recorded—approximately 28 seconds to fully load the coater.

Next, the opening was closed and the coater rotated so that the opening was at the bottom. Seed was then allowed to fall into a bin and the time needed to empty the coater was noted. Again, it took about 28 seconds to empty the coater. The total loading/unloading time of about one minute is well within the desired time for these steps of the treatment process. This test established that if one opening could load unload 800 kg of seeds in about one minute, it should be able to load and unload about 1600 kg seeds with two openings within about one minute.

Example 8: Estimation and Scale-Up of Drying Air Requirements to Reduce Cycle Time The main objective of these series of experiments was to understand and determine the drying air requirements for a desired cycle time and batch size. This information was then used to design the drying air system for the coater thereby making it suitable for row crop seed treatment application. First series of experiments were conducted in the VECTOR treater using cotton seeds. Seeds were treated with 50 fl oz (1.48 L) slurry per 100 lbs of seed or 80 fl oz (2.37 L) slurry per 100 lbs (45 kg) of seed. Eighty fl/oz/100 lbs (45 kg) represents the high end of large liquid volume application rate. Flow rate and the temperature of drying air were changed and the impact of these variables on cycle time (time required to apply and dry the seeds) was determined. From this data, presented in Table 2 below, the amount of total air (cu ft) required to dry 1 kg of cotton seeds treated with 50 fl oz of slurry was calculated. In this example, the drum was rotated at 11 RPM (34% of critical speed).

TABLE 2

Effect of Air Volume Rate (CFM) and Air Temp on Cycle Time and Total Drying Air Requirements.

| Batch Size, kg seed | Liquid Appl. Rate, fl oz/cwt | Air CFM/ kg | Air, CFM | Cycle Time | Total Air, CF | CF/ Kg | Inlet Air Temp, ° C. |
|---|---|---|---|---|---|---|---|
| 1.75 | 50 | 10 | 17.5 | 270 | 79 | 45 | 22 |
| 1.75 | 50 | 10 | 17.5 | 210 | 61 | 35 | 45 |
| 1.75 | 50 | 15 | 26.25 | 250 | 109 | 63 | 22 |
| 1.75 | 50 | 15 | 26.25 | 180 | 79 | 45 | 45 |
| 1.75 | 50 | 20 | 35 | 205 | 120 | 68 | 22 |
| 1.75 | 50 | 20 | 35 | 165 | 96 | 55 | 45 |
| 1.75 | 50 | 30 | 52.5 | 180 | 158 | 90 | 22 |
| 1.75 | 50 | 30 | 52.5 | 125 | 109 | 63 | 45 |

Figure 15:
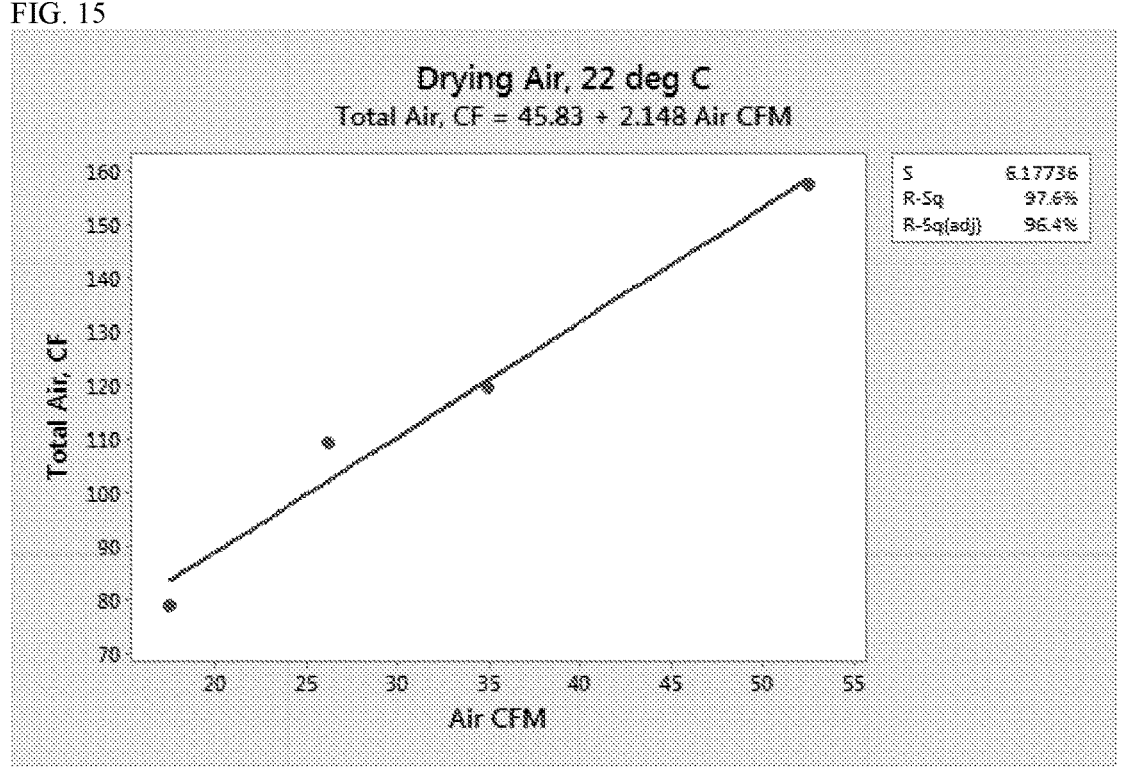
FIG. 15 is a graph of the total air required (cf) as a function of the air flow (cfm) for injected air at 22° C.
Figure 16:
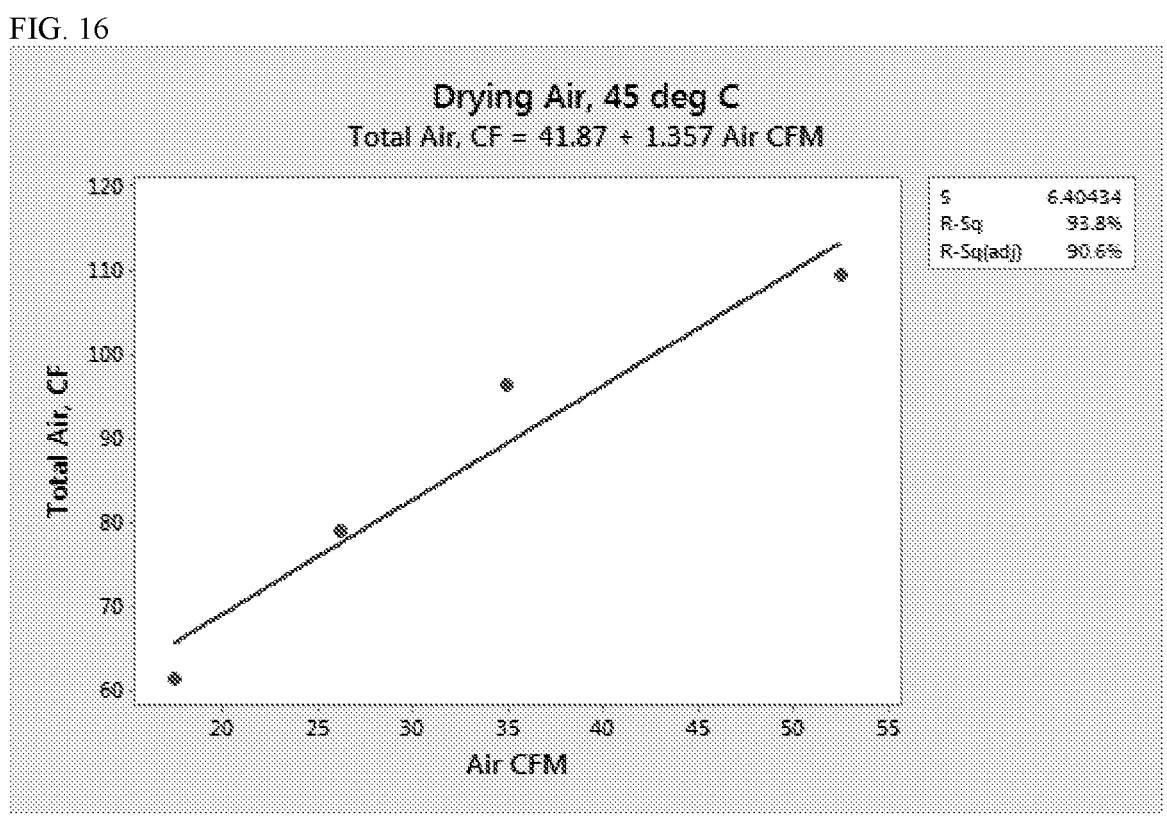
FIG. 16 is a graph of the total air required (cf) as a function of the air flow (cfm) for injected air at 45° C.

As the air CFM is increased, the amount of total air to dry the seeds is increased (FIGS. 15 and 16). This implies less efficient drying. In other words, increased air CFM does not reduce the cycle time in the same proportion. Therefore, increase in the total air requirement results in more waste and less efficient drying.

Figure 17:
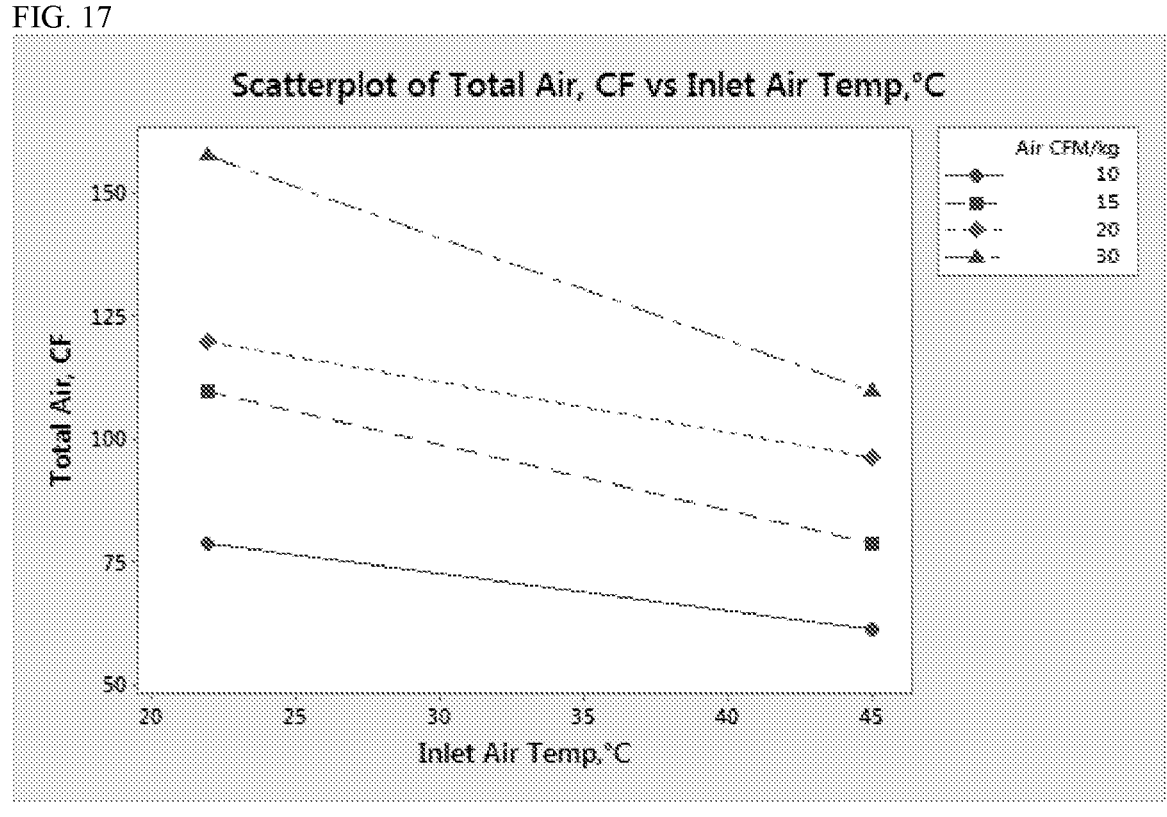
FIG. 17 is a scatterplot of the total air required (cf) as a function of the inlet air temperature (° C.) and the air flow (cfm/kg seed).
Figure 18:
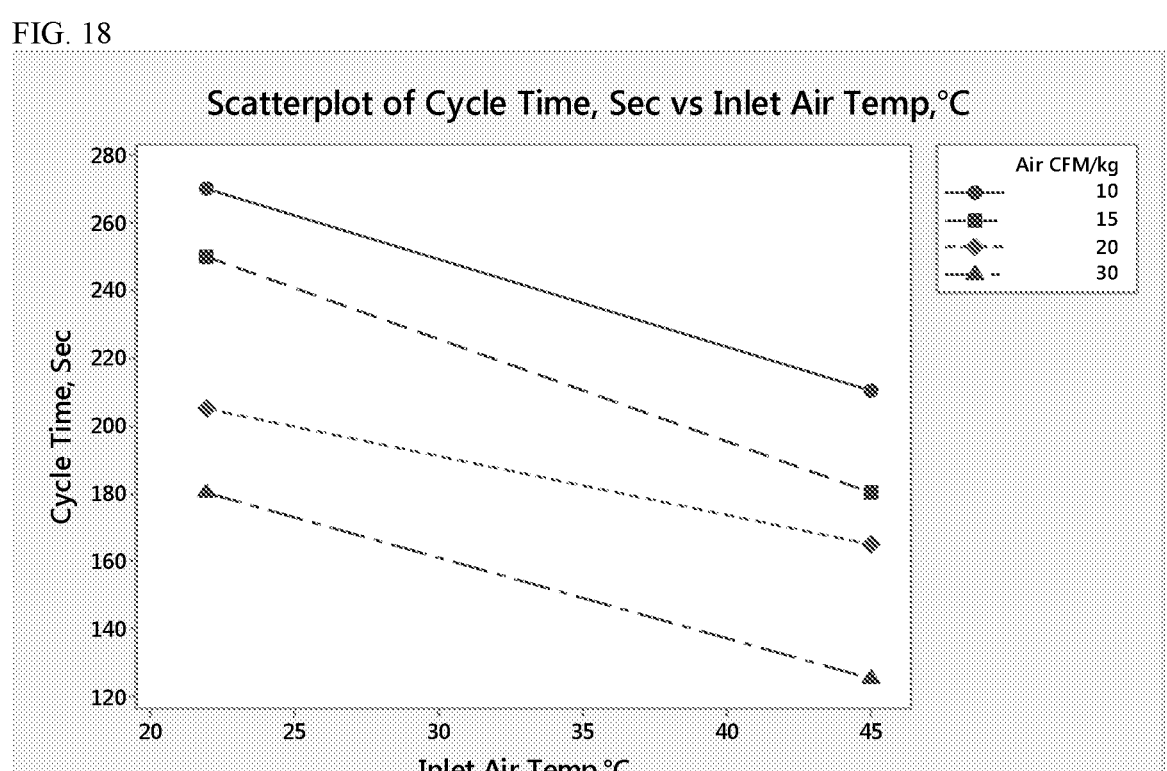
FIG. 18 is a scatterplot of the cycle time (sec) as a function of the inlet air temperature (° C.) and the air flow (cfm/kg seed).

As shown in FIG. 17, volume of the air required to dry the seeds decreases with increasing air temperature. Further, as shown in FIG. 18, cycle time to apply and dry seeds decreases with increasing air temperature.

Figure 19:
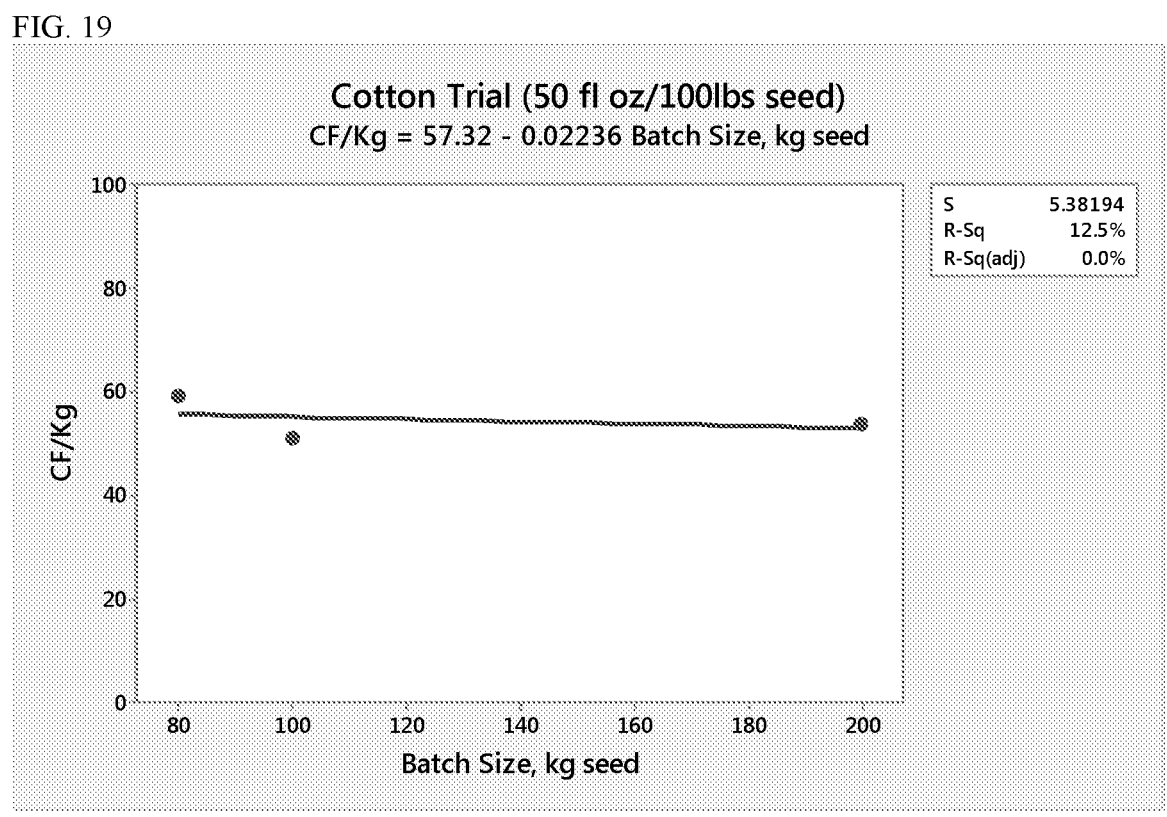
FIG. 19 is a graph of the total air required per kg of seed as a function of batch size (kg) (Batch Size: 1-2 kg).

Example 9: Estimation and Scale-Up of Drying Air Requirements to Reduce Cycle Time with Varied Batch Size Seeds were treated in a manner similar to Example 8, but the amount of seeds (batch size) in the treater was varied between from 1 kg, 1.5 kg, and 1.75 kg per batch. The resulting data were used to calculate the total air requirement to dry the seed as a function of batch size. This data, seen in FIG. 19, indicates that at small scales, volume of air/kg of seed is about constant and can therefore be used to estimate the total air required to dry seed with much larger batch sizes (e.g., 1,400 kg/batch).

However, before determining the air requirement for large commercial units, a series of experiments were done in a pilot scale coater (MODEL IDA Perforated Pan Coater by Dumoulin, France) where the batch size could be varied between 80 to 200 kg/batch. Data from the MODEL IDA coater validated the lab results that CF/kg is essentially independent of the batch size (FIG. 20).

Having established that CF/kg can be used to design the drying air system, experiments were again conducted in a VECTOR coater at 85 kg batch. To cover the extreme application scenarios, where even more than 50 fl oz/100 lbs (1.48 L/45 kg) of liquid application rate might be encountered, these tests were done at rates of 50 (1.48 L) and 80 fl oz (2.37 L)/100 lbs (45 kg). Furthermore, since higher air temperature helps in shortening the cycle time, drying air temperatures as high as 140° F. (60° C.) was tested. Table 3 below summarizes the data and show CF/kg requirements under all conditions.

TABLE 3

Effect of liquid application rate and inlet air temperature on total air requirements.

| Liquid Appl. Rate, fl oz/cwt | Inlet Air Temp, ° C. | Air CFM | Cycle, Sec | Total Air, CF | CF/Kg |
|---|---|---|---|---|---|
| 50 | 45 | 1000 | 220 | 3667 | 43 |
| 50 | 60 | 1000 | 180 | 3000 | 35 |
| 50 | 75 | 1000 | 185 | 3083 | 36 |
| 50 | 30 | 1000 | 300 | 5000 | 59 |
| 80 | 60 | 1000 | 300 | 5000 | 59 |

Table 3 shows that, to apply 80 fl oz/100 lbs (2.37 L/45 kg) liquid volume and dry the seeds in in about five minutes, 59 cu ft/kg (1.67 m³/kg) of 140° F. (60° C.) air will be required. This number was then used to calculate the total air requirement and CFM design for the blower to treat 1,400 kg seeds per batch. Since cotton represents the worst case in terms of liquid volume application, any coater designed for cotton will easily handle corn and soybeans where the liquid volume is half or less.

Table 4 below show the calculation for the final blower design parameters for five minutes drying cycle time.

TABLE 4

Seed Treatment Apparatus parameters for cotton seed (85 fl oz/100 lb) with a 5 minute drying cycle

| Batch Size, kg | 1400 |
|---|---|
| CF/Kg | 59 |
| Total Air, CF | 82600 |
| Blower Size, CFM | 16520 |

An equation to determine the blower size from the data is given below. It can be used to calculate the blower size for any given condition of batch size and drying cycle time.

Blower Size,CFM=CF/Kg*Batch Size/Cycle Time Desired

Similar experiments for corn with 45 fl oz/100 lbs (1331 mL/45 kg) (Table 5) and soy with 15 fl oz/100 lbs (444 mL/45 kg) (Table 6) generated the following design parameters:

TABLE 5

Seed Treatment Apparatus parameters for corn seed (45 fl oz/100 lb) with a 2 minute drying cycle time

| Batch Size, kg | 1400 |
|---|---|
| CF/Kg | 25 |
| Total Air, CF | 35000 |
| Blower Size, CFM | 17500 |

TABLE 6

Seed Treatment Apparatus parameters for soybean seed (15 fl oz/100 lb) with a 1.5 drying cycle time

| Batch Size, kg | 1400 |
|---|---|
| CF/Kg | 12 |
| Total Air, CF | 16800 |
| Blower Size, CFM | 11200 |

Example 9: Determination of Temperature of Water for Clean-in-Place (CIP)

Water is typically used in the CIP system. A series of experiments were done to determine the effect of water temperature (Room temp, 60° C., and greater than 60° C.) on cleaning efficiency. To determine this effect, we measured 0.5 mL of cotton seed treatment slurry with blue colorant and put it down the center of scoopulas with a consistent thickness, width, and length. The slurry was dried overnight before the washing tests were performed.

Two washing tests were performed. For the first washing tests, room temperature water (23.2° C.) and warm water (60° C.) were dispensed through a 30-mL syringe at a constant rate of 0.5 mL per second. The warm water (60° C.) took 10 minutes, or 300 mL of water, to wash the dried slurry completely off. The equivalent amount of room temperature water running over a scoopula at the same rate only cleaned approximately 2/5 of the slurry off. Based on this experiment, warm water appears to clean better than cold water.

For the second washing test, the above test was repeated, but water was dispensed over the scoopulas until all the slurry came off and boiling water was used as one of the treatments. Room temperature water (23.0° C.) took 19 minutes, or 570 mL of water, to wash the dried slurry completely off. In contrast, 60° C. water took 9 minutes and 40 seconds, or 290 mL of water, to wash the dried slurry completely off. Boiling water (99.1° C.) took 10 minutes and 10 seconds, or 305 mL of water, to wash the dried slurry completely off. It was found, therefore, that 60° C. water consistently cleans better than cold water, and boiling water provides no additional benefit over warm water at 60° C.

Embodiments

For further illustration, additional non-limiting embodiments of the present disclosure are set forth below.

For example, embodiment 1 is a method of preparing treating seeds, the method comprising:

providing seeds in a seed treatment apparatus;

contacting the seeds with a liquid seed treatment, thereby producing wetted seeds;

drying the wetted seeds;

wherein contacting the seeds with the liquid seed treatment and drying the wetted seeds occur simultaneously.

Embodiment 2 is the method of embodiment 1 wherein the drying of the wetted seeds occurs through injection of ambient air, dehumidified air, heated air, or a combination thereof.

Embodiment 3 is the method of embodiment 2 wherein the injection of air occurs at a rate of from about 10 cubic feet per minute (0.283 m³/min) to about 20,000 cubic feet per minute (566 m³/min).

Embodiment 4 is the method of any of embodiments 1 to 3 wherein at least 55 fluid ounces (1627 mL) of liquid seed treatment is applied per 100 pounds (45 kg) of seed.

Embodiment 5 is the method of any of embodiments 1 to 3 wherein the seed is corn seed and wherein over 30 fluid ounces (887 mL) of liquid seed treatment is applied per 100 pounds of seed.

Embodiment 6 is the method of any of embodiments 1 to 3 wherein the seed is soybean seed and wherein over 8 fluid ounces (237 mL) of liquid seed treatment is applied per 100 pounds of seed.

Embodiment 7 is the method of any of embodiments 1 to 4 wherein the seed is cotton seed and wherein at least 45 fluid ounces (1331 mL) of liquid seed treatment is applied per 100 pounds of seed.

Embodiment 8 is the method of any of embodiments 1 to 7 further comprising applying a dry seed treatment.

Embodiment 9 is the method of embodiment 8 wherein the dry seed treatment is applied in the seed treatment apparatus used to contact the seeds with the liquid seed treatment.

Embodiment 10 is the method of any of embodiments 1 to 4 and 6 to 9 wherein the seed is cotton seed and the seeds have a seed throughput in the seed treatment apparatus of greater than about 175 kg of seed per minute and wherein at least about 100 fluid ounces (2957 mL) liquid seed treatment is applied per 100 pounds (45 kg) of seed.

Embodiment 11 is the method of any one of embodiments 1 to 4, 6, 8 or 9 wherein the seed is soybean seed and the seeds have a seed throughput in the seed treatment apparatus of greater than about 200 kg of seed per minute and wherein at least about 14 fluid ounces (414 mL) of liquid seed treatment is applied per 100 pounds (45 kg) of seed.

Embodiment 12 is the method of any one of embodiments 1 to 5, 8 or 9 wherein the seed is corn seed and the seeds have a seed throughput of greater than about 200 kg of seed per minute and wherein at least about 45 fluid ounces (1331 mL) liquid seed treatment is applied per 100 pounds (45 kg) of seed.

Embodiment 13 is the method of any of embodiments 1 to 12 wherein at least about 95% of the seeds are fully coated with the liquid seed treatment.

Embodiment 14 is the method of any of embodiments 1 to 13 wherein the liquid seed treatment comprises one or more biological agents, one or more agrochemicals, or a combination thereof.

Embodiment 15 is the method of any of embodiments 1 to 14 wherein the liquid seed treatment comprises a pesticide selected from the group consisting of fungicides, insecticides, nematicides, and mixtures thereof.

Embodiment 16 is the method of any one of embodiments 1 to 15 wherein the liquid seed treatment comprises a biological agent, microbial extract, plant growth activator, plant defense agent, or a mixture thereof.

Embodiment 17 is the method of embodiment 16 wherein the liquid seed treatment comprises a biological agent selected from the group consisting of bacteria, fungi, beneficial nematodes, and viruses.

Embodiment 18 is the method of any of embodiments 8 to 17 wherein the dry seed treatment comprises one or more biological agents, one or more agrochemicals, one or more flowability agents, or a combination thereof.

Embodiment 19 is the method of embodiment 18 wherein the one or more biological agents is selected from the group consisting of bacteria, fungi, beneficial nematodes, and viruses.

Embodiment 20 is the method of any of embodiments 1 to 19 wherein the seed treatment apparatus comprises a perforated drum treater.

Embodiment 21 is the method of any of embodiments 8 to 20 wherein the dry seed treatment is introduced into the seed treatment apparatus after a conditioning period of from about 2 seconds to about 2 minutes, from about 2 seconds to about 1 minute, from about 5 seconds to about 30 seconds, or from about 5 seconds to about 20 seconds after the seeds are contacted with the liquid seed treatment.

Embodiment 22 is the method of any of embodiments 1 to 21 wherein the seed is contacted with the liquid seed treatment for a duration of less than about 2 minutes, less than about 1 minute, less than about 45 seconds, less than about 30 seconds, or less than about 20 seconds.

Embodiment 23 is the method of any of embodiments 8 to 22 wherein the seed is contacted with the dry seed treatment for a duration of less than about 2 minutes, less than about 1 minute, less than about 45 seconds, less than about 30 seconds, or less than about 20 seconds.

Embodiment 24 is the method of any of embodiments 1 to 23 wherein the liquid seed treatment is in the form of a slurry comprising an aqueous phase and a dispersed solid phase.

Embodiment 25 is the method of any of embodiments 1 to 24 wherein the seeds are provided in the seed treatment apparatus through an opening positioned near the top of the seed treatment apparatus.

Embodiment 26 is the method of any of embodiments 1 to 25 further comprising removing the seeds from the seed treatment apparatus through an opening positioned near the bottom of the seed treatment apparatus.

Embodiment 27 is the method of any of embodiments 1 to 26 wherein the seed treatment apparatus comprises:

a drum selectively rotatable about a horizontal axis and defining an interior sized and shaped to receive seeds therein for treatment, the perforated drum including a circumferential wall surrounding the horizontal axis and at least partially defining the interior, the circumferential wall having i) a plurality of perforations leading to the interior of the drum and being sized and shaped to inhibit seeds from exiting the interior therethrough, and ii) a port sized and shaped to deliver seeds into the interior of the drum, a port door selectively movable relative to the circumferential wall between an open position to open the port and allow seeds to enter the interior of the drum, and a closed position to close the port and retain the seeds in the interior of the perforated drum;

a seed treatment delivery system in communication with the interior of the drum and configured to deliver liquid seed treatment to the interior of the drum to wet the seeds in the drum; and a drying system in communication with the perforations of the circumferential wall of the drum and configured to deliver air into the interior of the drum through the perforations in the circumferential wall to dry the wetted seeds.

Embodiment 28 is a treated seed produced according to the method of any one of embodiments 1 to 27.

Embodiment 29 is a seed treatment apparatus comprising:

a drum selectively rotatable about a horizontal axis and defining an interior sized and shaped to receive seeds therein for treatment, the perforated drum including a circumferential wall surrounding the horizontal axis and at least partially defining the interior, the circumferential wall having i) a plurality of perforations leading to the interior of the drum and being sized and shaped to inhibit seeds from exiting the interior therethrough, and ii) a port sized and shaped to deliver seeds into the interior of the drum, a port door selectively movable relative to the circumferential wall between an open position to open the port and allow seeds to enter the interior of the drum, and a closed position to close the port and retain the seeds in the interior of the perforated drum;

a seed treatment delivery system in communication with the interior of the drum and configured to deliver liquid seed treatment to the interior of the drum to wet the seeds in the drum; and a drying system in communication with the perforations of the circumferential wall of the drum and configured to deliver air into the interior of the drum through the perforations in the circumferential wall to dry the wetted seeds.

Embodiment 30 is method of cleaning the seed treatment apparatus of embodiment 29, the method comprising spraying the seed treatment apparatus with water, wherein the water is high pressure water heated to at least about 50° C.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above products and methods without departing from the scope of the invention, it is intended that all matter contained in the above description and shown in the accompanying drawings shall be interpreted as illustrative and not in a limiting sense.

What is claimed is:

1. A method of treating seeds, the method comprising:
providing seeds in a seed treatment apparatus;
contacting the seeds with a liquid seed treatment in the seed treatment apparatus, thereby producing wetted seeds, and;
drying the wetted seeds in the seed treatment apparatus;
wherein contacting the seeds with the liquid seed treatment and drying the wetted seeds occur simultaneously,
wherein the drying of the wetted seeds occurs through injection of ambient air, dehumidified air, heated air, or a combination thereof;
wherein drying the wetted seeds includes drying the wetted seeds through an injection of air at a rate of from about 10 cubic feet (0.283 cubic meters) per minute to about 20,000 cubic feet (566 cubic meters) per minute; and
wherein a total cycle time of providing the seeds, contacting the seeds with the liquid seed treatment to produce the wetted seeds and drying the wetted seeds is 8 minutes or less, and wherein the seed treatment throughput of the method during the cycle time is at from about 4,000 kg seeds per hour to about 12,000 kg seeds per hour and at least 95% of the seeds are fully coated with the liquid seed treatment, wherein the seeds are selected from corn seeds, soybean seeds, cotton seeds, or canola seeds, and wherein:
when the seeds are corn seeds over 30 fluid ounces (887 mL) of liquid seed treatment is applied per 100 pounds (45 kg) of seed,
when the seeds are soybean seeds over 8 fluid ounces (237 mL) of liquid seed treatment is applied per 100 pounds (45 kg) of seed, and
when the seeds are canola seeds at least 50 fluid ounces (1479 mL) of liquid seed treatment is applied per 100 pounds (45 kg) of seed.

2. The method of claim 1, wherein the air is ambient air, heated air, or a combination thereof.

3. The method of claim 2, wherein the injection of air occurs at a rate of from about 10 cubic feet (0.283 cubic meters) per minute to about 10,000 cubic feet (283 cubic meters) per minute.

4. The method of claim 1, wherein the seeds are selected from corn seeds, soybean seeds, cotton seeds, or canola seeds and at least 55 fluid ounces (1627 mL) of liquid seed treatment is applied per 100 pounds (45 kg) of seed.

5. The method of claim 1, wherein the seeds are corn seeds and wherein over 30 fluid ounces (887 mL) of liquid seed treatment is applied per 100 pounds (45 kg) of corn seed.

6. The method of claim 1, wherein the seeds are soybean seeds and wherein over 8 fluid ounces (237 mL) of liquid seed treatment is applied per 100 pounds (45 kg) of soybean seed.

7. The method of claim 1, wherein the seeds are cotton seeds and wherein at least 45 fluid ounces (1331 mL) of liquid seed treatment is applied per 100 pounds (45 kg) of cotton seed.

8. A method of treating seeds, the method comprising:

providing seeds in a seed treatment apparatus;

contacting the seeds with a liquid seed treatment in the seed treatment apparatus, thereby producing wetted seeds, and;

drying the wetted seeds in the seed treatment apparatus;

wherein contacting the seeds with the liquid seed treatment and drying the wetted seeds occur simultaneously, wherein the drying of the wetted seeds occurs through injection of ambient air, dehumidified air, heated air, or a combination thereof;

wherein drying the wetted seeds includes drying the wetted seeds through an injection of air at a rate of from about 10 cubic feet (0.283 cubic meters) per minute to about 20,000 cubic feet (566 cubic meters) per minute; and wherein a total cycle time of providing the seeds, contacting the seeds with the liquid seed treatment to produce the wetted seeds and drying the wetted seeds is 10 minutes or less, and wherein the seed treatment throughput of the method during the cycle time is at least 4,000 kg seeds per hour and at least 95% of the seeds are fully coated with the liquid seed treatment, wherein the seeds are selected from corn seeds, soybean seeds, cotton seeds, or canola seeds, and wherein:

when the seeds are corn seeds over 30 fluid ounces (887 mL) of liquid seed treatment is applied per 100 pounds (45 kg) of seed, when the seeds are soybean seeds over 8 fluid ounces (237 mL) of liquid seed treatment is applied per 100 pounds (45 kg) of seed, and when the seeds are canola seeds at least 50 fluid ounces (1479 mL) of liquid seed treatment is applied per 100 pounds (45 kg) of seed, the method further comprising applying a dry seed treatment following application of the liquid seed treatment in the seed treatment apparatus used to contact the seeds with the liquid seed treatment.

9. The method of claim 1, wherein the seeds are cotton seeds and the cotton seeds have a seed throughput in the seed treatment apparatus of greater than about 175 kg of seed per minute and wherein at least about 100 fluid ounces (2957 mL) liquid seed treatment is applied per 100 pounds (45 kg) of seed.

10. The method of claim 1, wherein the seeds are soybean seeds and the soybean seeds have a seed throughput in the seed treatment apparatus of greater than about 200 kg of seed per minute and wherein at least about 14 fluid ounces (414 mL) liquid seed treatment is applied per 100 pounds (45 kg) of seed.

11. The method of claim 1, wherein the seeds are corn seeds and the corn seeds have a seed throughput in the seed treatment apparatus of greater than about 200 kg of seed per minute and wherein at least about 45 fluid ounces (1331 mL) liquid seed treatment is applied per 100 pounds (45 kg) of seed.

12. The method of claim 1, wherein the liquid seed treatment comprises one or more biological agents, one or more agrochemicals, or a combination thereof.

13. The method of claim 1, wherein the liquid seed treatment comprises a pesticide selected from the group consisting of fungicides, insecticides, nematicides, and mixtures thereof.

14. The method of claim 1, wherein the liquid seed treatment comprises a biological agent, microbial extract, plant growth activator, plant defense agent, or a mixture thereof.

15. The method of claim 1, wherein the dry seed treatment comprises one or more biological agents, one or more agrochemicals, one or more flowability agents, or a combination thereof.

16. The method of claim 1, wherein providing the seeds in the seed treatment apparatus includes receiving the seeds in a drum of the seed treatment apparatus; and wherein the method further comprises delivering the liquid seed treatment to the drum of the seed treatment apparatus after the seeds are received in the drum.

17. The method of claim 16, wherein contacting the seeds with the liquid seed treatment includes rotating the drum of the seed treatment apparatus.

18. The method of claim 16, wherein drying the wetted seeds includes directing air into the drum of the seed treatment apparatus via perforations defined in a sidewall of the drum.

19. The method of claim 8, wherein the seeds are contacted with the dry seed treatment for a duration of less than about 2 minutes.

20. The method of claim 1, wherein the liquid seed treatment is in the form of a slurry comprising an aqueous phase and a dispersed solid phase.

21. The method of claim 1, wherein a total cycle time for providing the seeds, contacting the seeds with the liquid seed treatment to produce the wetted seeds and drying the wetted seeds is from about 30 seconds to 8 minutes.

22. The method of claim 1, wherein the seeds are canola seeds and at least 50 fluid ounces (1479 mL) of liquid seed treatment is applied per 100 pounds (45 kg) of seed.

\* \* \* \* \*